(12) United States Patent
Yamaguchi

(10) Patent No.: US 10,145,705 B2
(45) Date of Patent: Dec. 4, 2018

(54) DESTINATION INFORMATION PROVIDER SERVER, DESTINATION INFORMATION PROVIDER SYSTEM AND ON-VEHICLE DEVICE

(71) Applicant: TOYOTA JIDOSHA KABUSHIKI KAISHA, Toyota-shi, Aichi-ken (JP)

(72) Inventor: Tomonari Yamaguchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 10 days.

(21) Appl. No.: 15/381,983

(22) Filed: Dec. 16, 2016

(65) Prior Publication Data
US 2017/0184412 A1   Jun. 29, 2017

(30) Foreign Application Priority Data
Dec. 24, 2015 (JP) ................................. 2015-252432

(51) Int. Cl.
G01C 21/34 (2006.01)
G01C 21/36 (2006.01)
G08G 1/16 (2006.01)

(52) U.S. Cl.
CPC ........... *G01C 21/3667* (2013.01); *G08G 1/16* (2013.01)

(58) Field of Classification Search
CPC ........ G01C 21/26; G01C 21/34; G01C 21/36; G08G 1/16
See application file for complete search history.

(56) References Cited

U.S. PATENT DOCUMENTS

| 7,680,596 B2* | 3/2010 | Uyeki | G01C 21/3415 340/995.19 |
| 7,818,121 B2* | 10/2010 | Uyeki | G01C 21/3415 340/995.19 |
| 7,881,863 B2* | 2/2011 | Uyeki | G01C 21/3415 340/995.19 |
| 8,433,504 B2* | 4/2013 | Hayashida | G01C 21/26 340/917 |
| 9,429,445 B2* | 8/2016 | Tang | G01C 21/3611 |
| 9,677,893 B2* | 6/2017 | Breed | G01C 21/30 |
| 2011/0130964 A1 | 6/2011 | Kitagawa et al. | |
| 2011/0160989 A1* | 6/2011 | Uyeki | G01C 21/3415 701/119 |

FOREIGN PATENT DOCUMENTS

| JP | 2000-285381 A | 10/2000 |
| JP | 2006-275673 A | 10/2006 |
| JP | 2011-118463 A | 6/2011 |
| JP | 2012-150568 A | 8/2012 |
| JP | 2012-177712 A | 9/2012 |

* cited by examiner

*Primary Examiner* — Yonel Beaulieu
(74) *Attorney, Agent, or Firm* — Oliff PLC

(57) ABSTRACT

A destination information provider server is disclosed. The destination information provider server is configured to obtain position information of an information providing target vehicle, recognize a target link, which corresponds to a link of a road on which the information providing target vehicle is traveling, based on the position information, and transmit destination information to the information providing target vehicle, the destination information being indicative of destinations of other vehicles which travel on the target link.

5 Claims, 21 Drawing Sheets

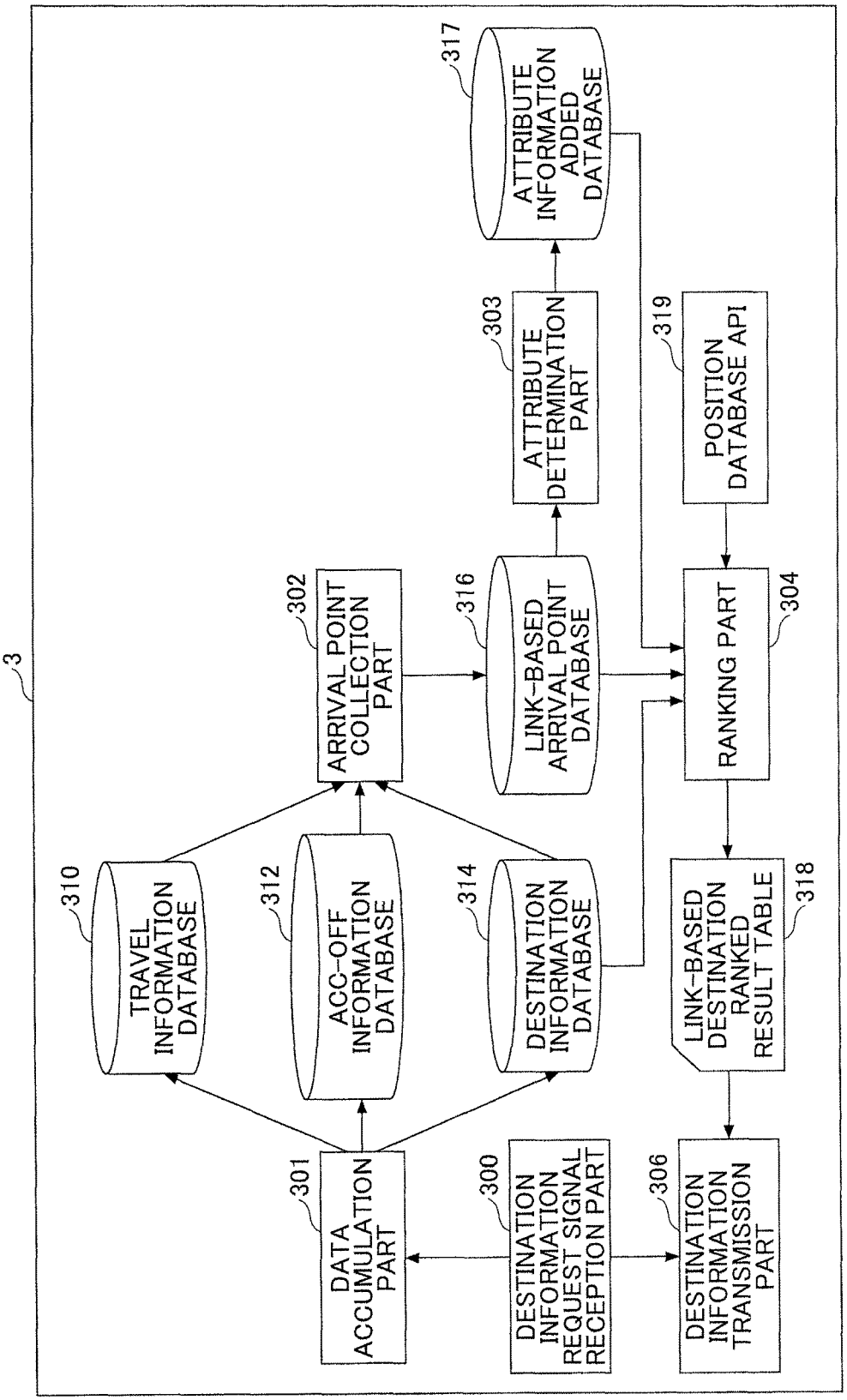

FIG.4A

TRAVEL INFORMATION ID=j

| TERMINAL ID | TRAVEL DATE/TIME | LINK ID (LINK ID OF RECEPTION LINK) |
|---|---|---|
| 00001 | ** | ** |
| 00001 | ** | ** |
| .... | .... | .... |
| 00001 | ** | ** |

FIG.4B

| TERMINAL ID | TRAVEL INFORMATION ID | ARRIVAL DATE/TIME | OWN VEHICLE POSITION (LATITUDE, LONGITUDE) |
|---|---|---|---|
| 00001 | ** | ** | ** |
| 00001 | ** | ** | ** |
| .... | .... | .... | .... |
| 00002 | ** | ** | ** |

FIG.4C

TERMINAL ID=j1

| LINK ID | DESTINATION |
|---------|-------------|
| ** | ** |
| ** | ** |
| .... | .... |
| ** | ** |

FIG.6A

COLLECTION TARGET LINK ID=N

| TERMINAL ID | ARRIVAL POINT (LATITUDE, LONGITUDE) | ARRIVAL DATE/TIME | TRAVEL DATE/TIME |
|---|---|---|---|
| 00001 | ** | ** | ** |
| 00001 | ** | ** | ** |
| .... | .... | .... | .... |
| 00002 | ** | ** | ** |

FIG.6B

COLLECTION TARGET LINK ID=N

| TERMINAL ID | ARRIVAL POINT (LATITUDE, LONGITUDE) |
|---|---|
| 00001 | ** |
| 00003 | ** |
| .... | .... |
| 01002 | ** |

FIG.6C

COLLECTION TARGET LINK ID=N

| TERMINAL ID | ARRIVAL POINT (LATITUDE, LONGITUDE) | ARRIVAL DATE/TIME | TRAVEL DATE/TIME | ACTION FLAG |
|---|---|---|---|---|
| 00001 | ** | ** | ** | ** |
| 00001 | ** | ** | ** | ** |
| ... | ... | ... | ... | ... |
| 00002 | ** | ** | ** | ** |

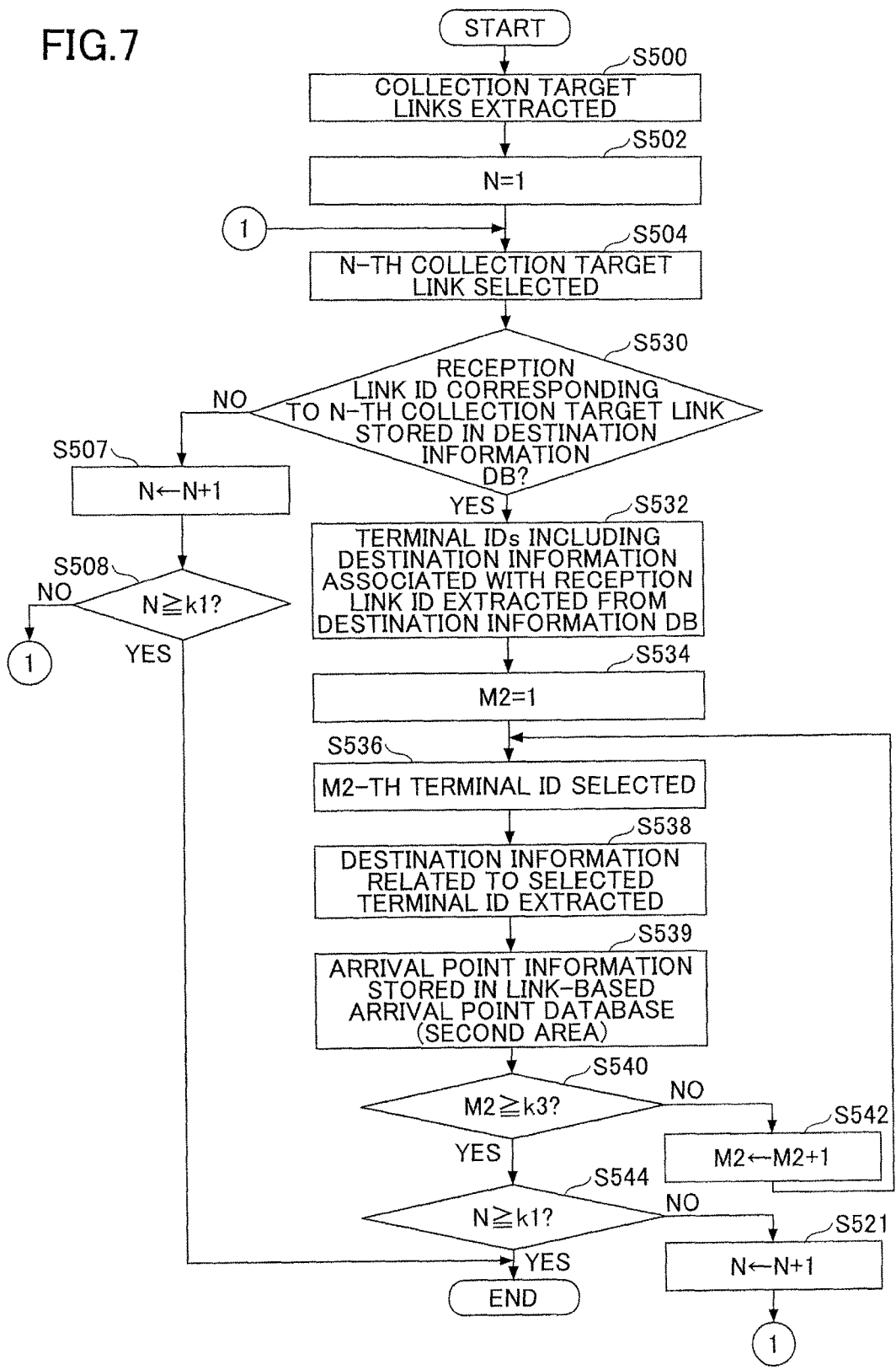

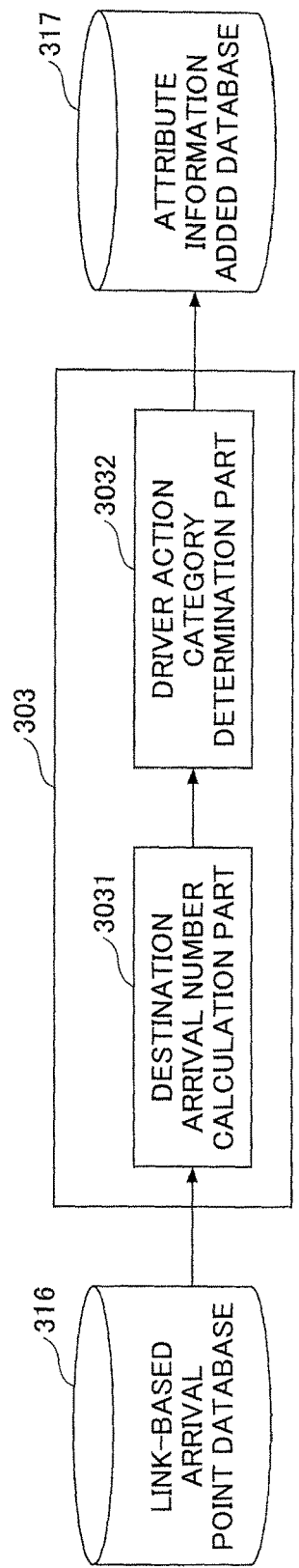

| RANKING | NAME, ETC. | NUMBER |
|---------|------------|--------|
| 1 | "TOYOTA HALL" | 21 |
| 2 | "WORK PLACE OR HOME" | 19 |
| 3 | "** NAGOYA CITY" | 18 |

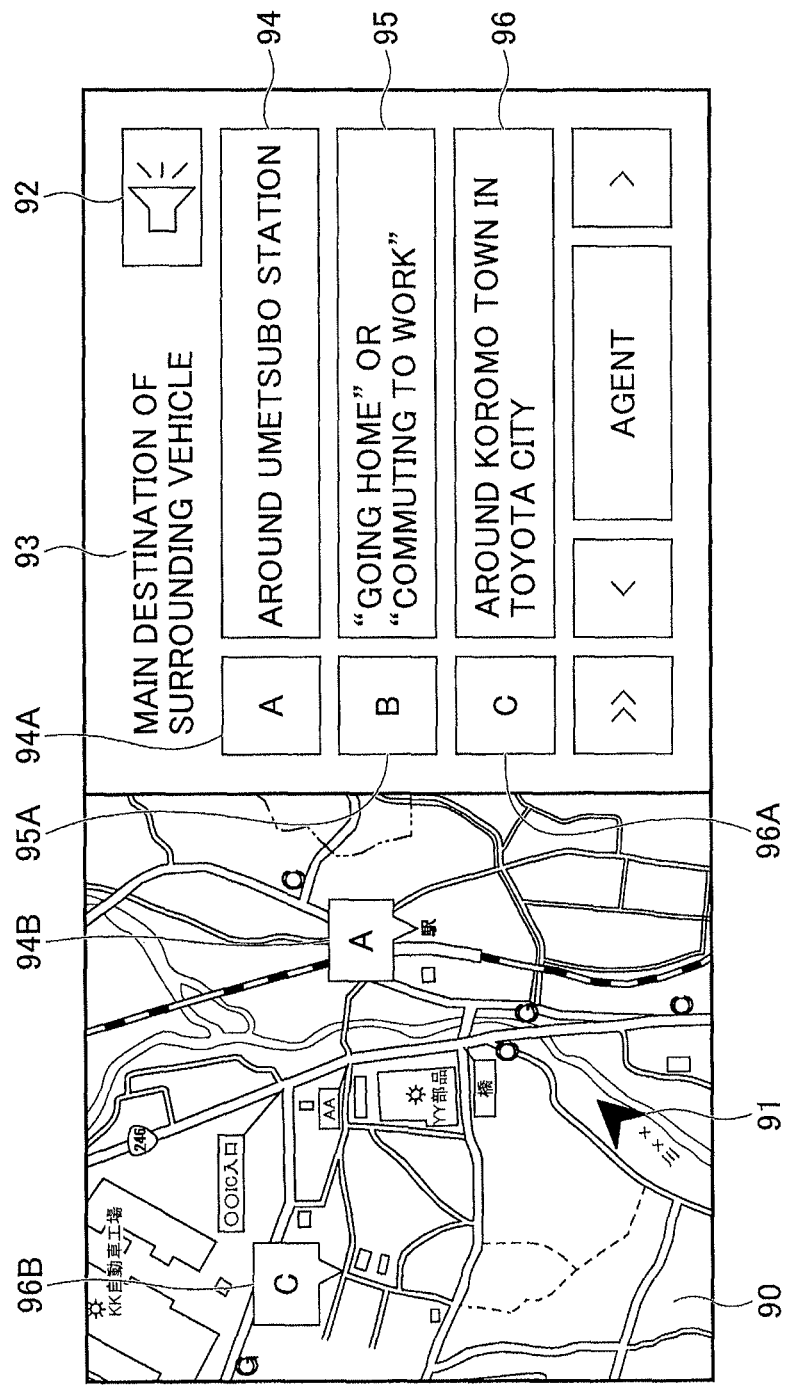

DESTINATION INFORMATION PROVIDER SERVER, DESTINATION INFORMATION PROVIDER SYSTEM AND ON-VEHICLE DEVICE

FIELD

The disclosure is related to a destination information provider server, a destination information provider system and an on-vehicle device.

BACKGROUND

A navigation apparatus is known from Japanese Laid-open Patent Publication No. 2006-275673, for example, which obtains position information of other vehicles, which are capable of communicating with the own vehicle, via vehicle-to-vehicle communication, etc., and displays the obtained position information of other vehicles on a display apparatus of the own vehicle.

However, according to the technique disclosed in Japanese Laid-open Patent Publication No. 2006-275673, a driver of the own vehicle can recognize the current positions of other vehicles, but cannot predict destinations of these vehicles. During a traffic jam, etc., the driver of the own vehicle may be interested in where the surrounding vehicles are headed (i.e., the destination of the surrounding vehicles).

Accordingly, it is an object in one aspect of the invention to provide a destination information provision server, etc., that can transmit information to an information providing target vehicle, and the information is indicative of destinations of other vehicles that travel on the same link as the information providing target vehicle.

SUMMARY

According to one aspect of the invention, a destination information provider server is provided, which is configured to:

obtain position information of an information providing target vehicle, recognize a target link, which corresponds to a link of a road on which the information providing target vehicle is traveling, based on the position information, and transmit destination information to the information providing target vehicle, the destination information being indicative of destinations of other vehicles which travel on the target link.

According to one aspect of the invention, the destination information provider server transmits the destination information to the information providing target vehicle. The destination information is indicative of destinations of other vehicles that travel on the target link. The target link is a link of a road on which the information providing target vehicle is traveling. Therefore, the destination information provision server can transmit information, which is indicative of destinations of other vehicles that travel on the same link as the information providing target vehicle, to the information providing target vehicle.

BRIEF DESCRIPTION OF DRAWINGS

FIG. 3 is a functional block diagram of a server 3.

FIG. 4A is a diagram conceptually illustrating an example of data in a travel information database 310.

FIG. 4B is a diagram conceptually illustrating an example of data in a ACC-OFF information database 312.

FIG. 4C is a diagram conceptually illustrating an example of data in a destination information database 314.

FIG. 6A is a diagram conceptually illustrating an example of data in a first area in a link-based arrival point database 316.

FIG. 6B is a diagram conceptually illustrating an example of data in a second area in a link-based arrival point database 316.

FIG. 6C is a diagram conceptually illustrating an example of result data in an attribute information added database 317.

FIG. 7 is a flowchart illustrating an example of a second arrival point collection process of the link-based arrival point collection process part 3023.

FIG. 8 is a functional block diagram of an attribute determination part 303.

FIG. 20 is a diagram illustrating an example of a displayed state of the destination information on a display apparatus 83.

DESCRIPTION OF EMBODIMENTS

In the following, embodiments will be described with reference to the accompanying drawings.

Figure 1:
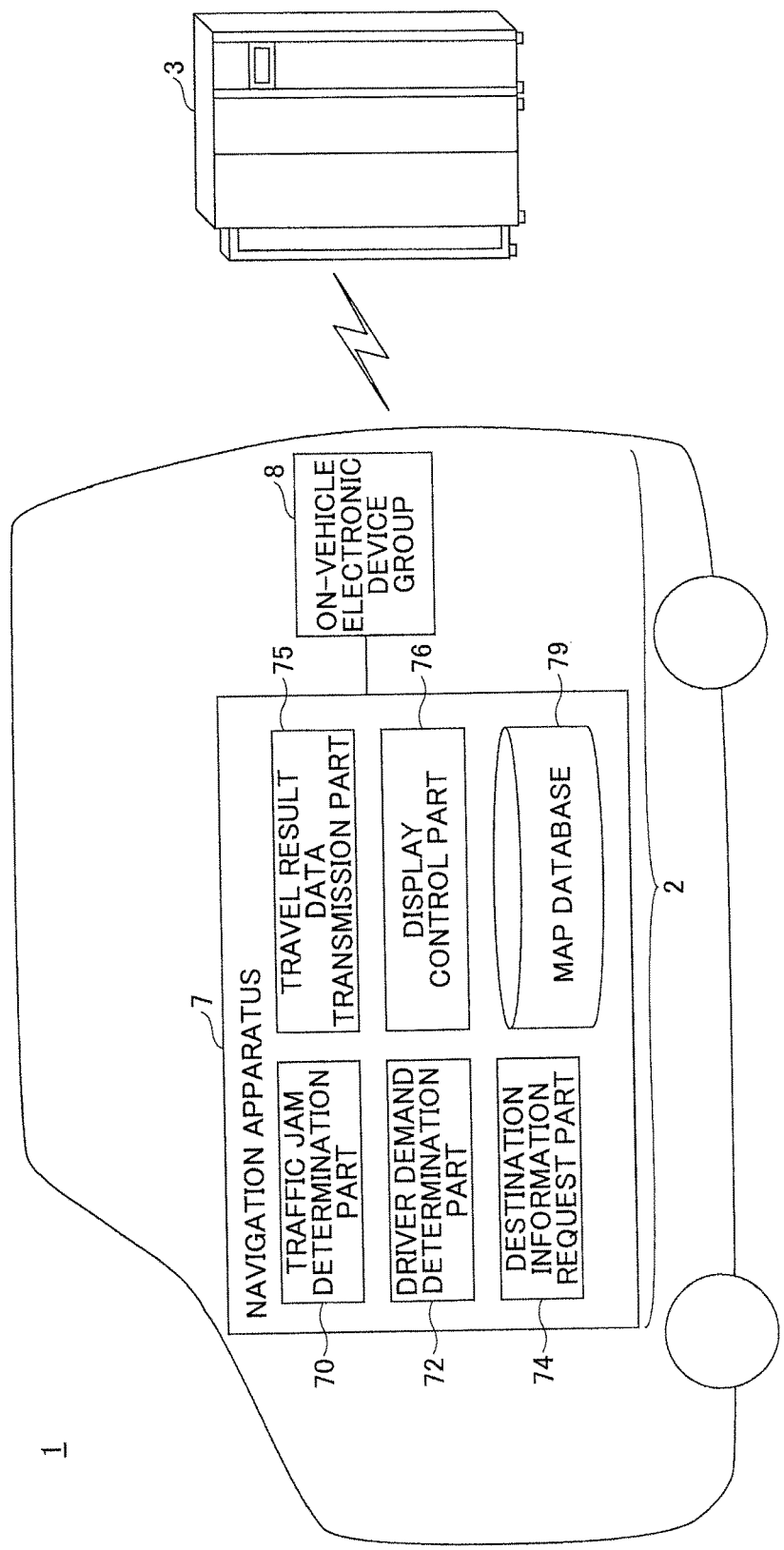
FIG. 1 is a diagram illustrating a configuration of an information collection system according to a first embodiment.

FIG. 1 is a diagram illustrating a configuration of an information collection system according to a first embodiment.

The information collection system 1 includes an on-vehicle device 2 installed on a vehicle and a server 3 (an example of a destination information provider server). The server 3 is disposed remotely with respect to the on-vehicle device 2. It is noted that it is assumed that a plurality of vehicles have the on-vehicle devices 2, respectively. In the following, unless otherwise specified, the on-vehicle device 2 installed on an arbitrary vehicle is described. Further, in the following, unless otherwise specified, the "own vehicle" represents the vehicle on which the on-vehicle device 2 is installed.

The on-vehicle device 2 includes a navigation apparatus 7 and an on-vehicle electronic device group 8.

Figure 2:
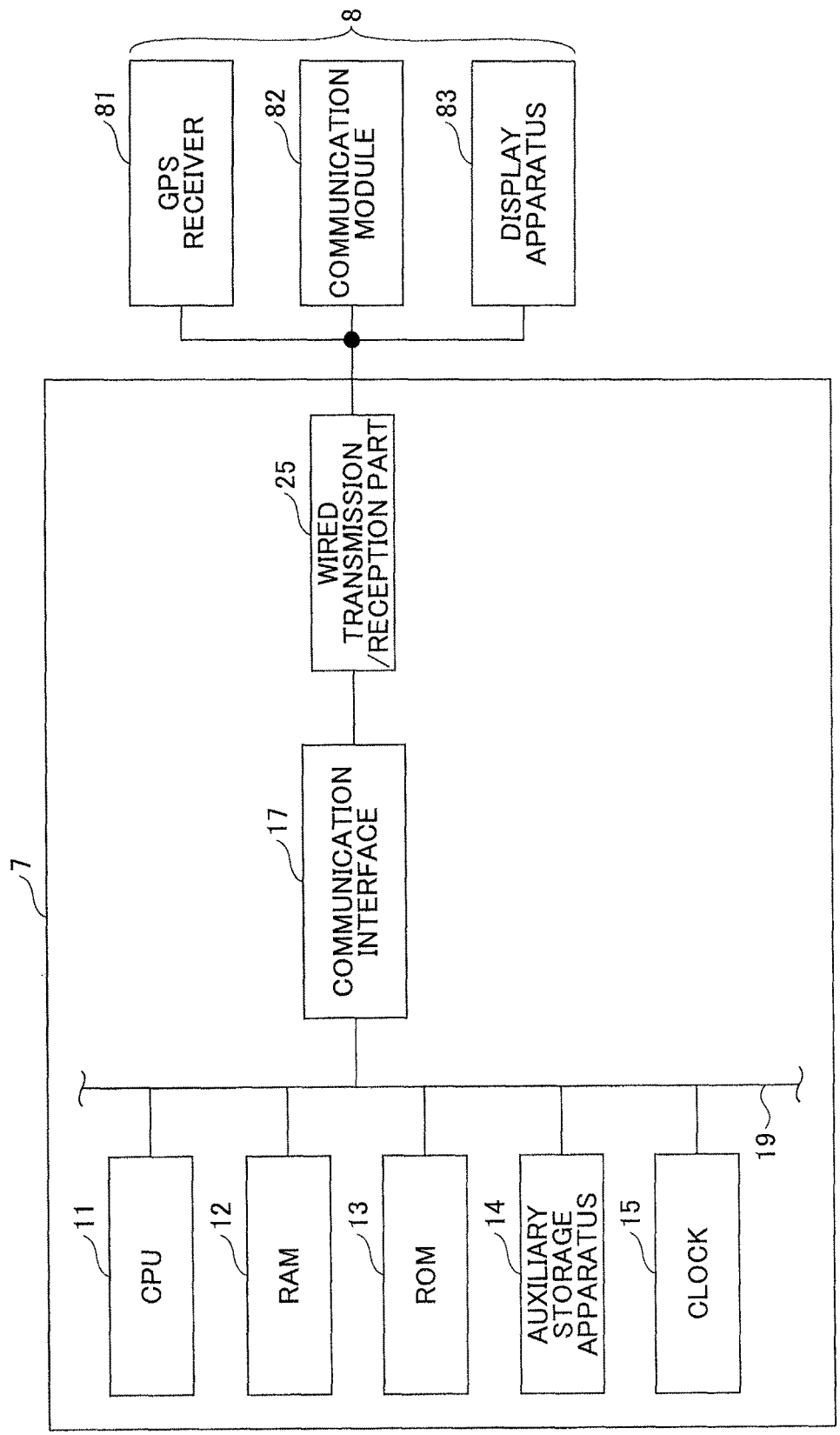
FIG. 2 is a diagram illustrating an example of a hardware configuration of a navigation apparatus 7.

FIG. 2 is a diagram illustrating an example of a hardware configuration of the navigation apparatus 7. In FIG. 2, an example of elements included in the on-vehicle electronic device group 8 is schematically illustrated in connection with a hardware configuration of the navigation apparatus 7.

The navigation apparatus 7 includes a CPU (Central Processing Unit) 11, a RAM (Random Access Memory) 12, a ROM (Read Only Memory) 13, the auxiliary storage apparatus 14, a clock 15, and a communication interface 17 which are coupled to a bus 19. Further, the navigation apparatus 7 includes a wired transmission/reception part 25 coupled to the communication interface 17.

The wired transmission/reception part 25 includes a transmission/reception part that is capable of communicating via a vehicle network such as CAN (Controller Area Network), LIN (Local Interconnect Network), etc. It is noted that the navigation apparatus 7 may include a second wireless transmission/reception part (not illustrated) coupled to the communication interface 17, in addition to the wired transmission/reception part 25. In this case, the second wireless transmission/reception part may include a Near Field Communication (NFC) part, a Bluetooth (trademark) communication part, a Wi-Fi (Wireless-Fidelity) transmission/reception part, an infrared transmission/reception part, etc.

The on-vehicle electronic device group 8 includes a GPS (Global Positioning System) receiver 81, a communication module 82, and a display apparatus 83.

The GPS receiver 81 measures an own vehicle position based on radio waves from GPS satellites.

The communication module 82 is capable of communicating via a wireless communication network used by cellular phones.

The display apparatus 83 is a liquid crystal display of a touch panel type, for example. The display apparatus 83 is provided at a location that enables a driver to view images on the display apparatus 83. The display apparatus 83 is fixed in the own vehicle; however, the display apparatus 83 may be implemented by a display of a portable terminal (a smart phone, a tablet, etc.) that may be brought into the own vehicle. In this case, the communication between the portable terminal and the navigation apparatus 7 can be implemented via a Bluetooth communication part (an element of the second wireless transmission/reception part), for example.

The navigation apparatus 7 includes a traffic jam determination part 70, a driver demand determination part 72, a destination information request part 74, a travel result data transmission part 75, and a display control part 76, as illustrated in FIG. 1. The traffic jam determination part 70, the driver demand determination part 72, the destination information request part 74, the travel result data transmission part 75, and the display control part 76 can be implemented by the CPU 11 illustrated in FIG. 2 performing one or more programs stored in the ROM 13, respectively. The navigation apparatus 7 includes a map database 79. The map database 79 can be implemented by the auxiliary storage apparatus 14 illustrated in FIG. 2.

The traffic jam determination part 70 determines, based on information from the GPS receiver 81 and traffic information obtained from the outside, whether the own vehicle enters a traffic jam section. For example, the traffic jam determination part 70 determines that the own vehicle enters the traffic jam section when the own vehicle position is near a start point of the traffic jam section. Alternatively, the traffic jam determination part 70 may determine, based on traffic jam condition calculated from average vehicle speed, whether the own vehicle enters a traffic jam section. For example, the traffic jam determination part 70 compares, based on the link on which the own vehicle travels, a threshold associated with the link (i.e., a threshold defined on a road type basis) with the average vehicle speed of the own vehicle over a certain time after the start of the link, and determines that the own vehicle enters the traffic jam section when the average vehicle speed is less than or equal to the threshold.

The driver demand determination part 72 determines, based on an input from the driver, whether the driver requests destination information. The input from the driver is implemented via a touch switch on the display apparatus 83, for example.

The destination information request part 74 transmits a signal (referred to as "a destination information request signal", hereinafter) for requesting the destination information to the server 3, when the own vehicle is in the traffic jam section or the driver requests the destination information, as described hereinafter (see FIG. 18). The destination information request part 74 transmits the destination information request signal to the server 3 via the communication module 82. Information included in the destination information request signal includes an ID (Identification) of the communication module 82 (referred to as "a terminal ID", hereinafter), and own vehicle information obtained from the GPS receiver 81. The terminal ID is unique to the communication module 82, and substantially functions as an ID for identifying the own vehicle. However, instead of the terminal ID, a driver ID for identifying a driver may be used. This is suited for a case where the own vehicle is to be used in a shared manner among a plurality of users. Further, instead of the own vehicle information, a link ID of a link on which the own vehicle is traveling may be used. The link ID is allocated on a link (road link) basis. It is noted that the links are set separately for inbound and outbound of the same road.

The travel result data transmission part 75 regularly transmits travel information to the server 3 during the travel period of the own vehicle. The travel result data transmission part 75 transmits the travel information to the server 3 via the communication module 82. The travel information includes the terminal ID, a travel date/time, the link ID. The link ID included in the travel information is related to the link on which the own vehicle is traveling. The link ID related to the link on which the own vehicle is traveling can be obtained based on the own vehicle position information and the information in the map database 79. The link ID included in the travel information is related to all the links through which the own vehicle has passed in a period from the previous transmission cycle to the current transmission cycle. Alternatively, the link ID included in the travel information may be related to only particular links, among the links through which the own vehicle has passed in a period from the previous transmission cycle to the current transmission cycle. The particular links are related predetermined types of roads, for example. The travel date/time can be obtained by the clock 15, for example. The travel date/time is at the current transmission cycle, for example.

The travel information further includes destination information indicating the destination, if the destination is set by the navigation function. The destination information represents a position (latitude and longitude) of the destination, for example.

Further, the travel result data transmission part 75 transmits ACC-OFF information to the server 3 when an accessary switch is turned off, for example. The travel result data transmission part 75 transmits the ACC-OFF information to the server 3 via the communication module 82. The ACC-OFF information includes the terminal ID, an arrival date/time, and own vehicle position information (latitude and longitude) at the arrival. The arrival date/time is at the ACC-OFF timing.

The display control part 76 controls the display of the display apparatus 83. For example, the display control part 76 outputs, based on the destination information (described hereinafter) received from the server 3, the display representing the destinations of the surrounding other vehicles on the display apparatus 83 (see FIG. 20). The display control part 76 receives the destination information from the server 3 via the communication module 82.

The map database 79 stores map data. The map data may include coordinate information of nodes corresponding to intersections and merge/junction points of highways, link information connecting to the adjacent nodes, information on a width of roads corresponding to the respective links, information on a road type of the respective links, such as a national road, a prefecture road, a highway or the like, for example.

FIG. 3 is a functional block diagram of the server 3. The hardware configuration of the server 3 is not illustrated. A basic hardware configuration (architecture) of the server 3 is the same as that of the navigation apparatus 7 illustrated in FIG. 2 except that the process capability and the storage capacity are enhanced.

The server 3 includes a destination information request signal reception part 300, a data accumulation part 301, an arrival point collection part 302, an attribute determination part 303, a ranking part 304, and a destination information transmission part 306. The server 3 includes a travel information database 310, an ACC-OFF information database 312, a destination information database 314, a link-based arrival point database 316, and an attribute information added database 317. The destination information request signal reception part 300, the data accumulation part 301, the arrival point collection part 302, the attribute determination part 303, the ranking part 304, and the destination information transmission part 306 can be implemented by a CPU executing one or more programs stored in a ROM, respectively. The respective databases such as the travel information database 310, etc., can be implemented by an auxiliary storage apparatus 14 (a hard disk drive, for example). Further, the server 3 includes a link-based destination rank result table 318 (an example of ranking information), and a position database API (Application Programming Interface) 319. The link-based destination ranked result table 318 can be stored in the auxiliary storage apparatus 14 (an example of a ranking information storage part).

The destination information request signal reception part 300 receives the destination information request signal from the on-vehicle device 2. The destination information request signal reception part 300 performs processes for the received destination information request signal, such as a decoding process, etc., to provide the destination information transmission part 306 with the information included in the destination information request signal.

The data accumulation part 301 receives the travel information from the on-vehicle device 2 to accumulate the received travel information in the travel information database 310. The data accumulation part 301 accumulates the regularly received travel information such that the received travel information is associated with a travel information ID, before the reception of the ACC-OFF information from the on-vehicle device 2 related to the terminal ID included in the received travel information. In the following, the link ID included in the received travel information is referred to as "a reception link ID". FIG. 4A is a diagram schematically illustrating an example of data in the travel information database 31. In FIG. 4A, data related to a certain travel information ID=j is illustrated. It is noted that, in FIG. 4A, "**" means that there is corresponding information. This holds true for other similar drawings (FIG. 4B, FIG. 4C, FIG. 6A, FIG. 6B, etc.).

Further, at that time, if the destination information is included in the travel information, the data accumulation part 301 stores the destination information in the destination information database 314 such that the destination information is associated with the reception link ID included in the travel information. The destination information in the destination information database 314 is updated every time when new destination information related to the same terminal ID is obtained. Further, in order to keep freshness of the destination information, the destination information in the destination information database 314 is deleted if new destination information related to the same terminal ID cannot be obtained within a predetermined time. FIG. 4C is a diagram schematically illustrating an example of data in the destination information database 314.

The data accumulation part 301 accumulates the ACC-OFF information in the ACC-OFF information database 312 such that the ACC-OFF information is associated with the travel information ID of the corresponding travel information, when the ACC-OFF information is received from the on-vehicle device 2. FIG. 4B is a diagram schematically illustrating an example of data in the ACC-OFF information database 312. In FIG. 4B, data related to a plurality of travel information IDs is illustrated.

The arrival point collection part 302 collects arrival points of vehicles (i.e., the vehicle) that travel on the links.

Figure 5A:
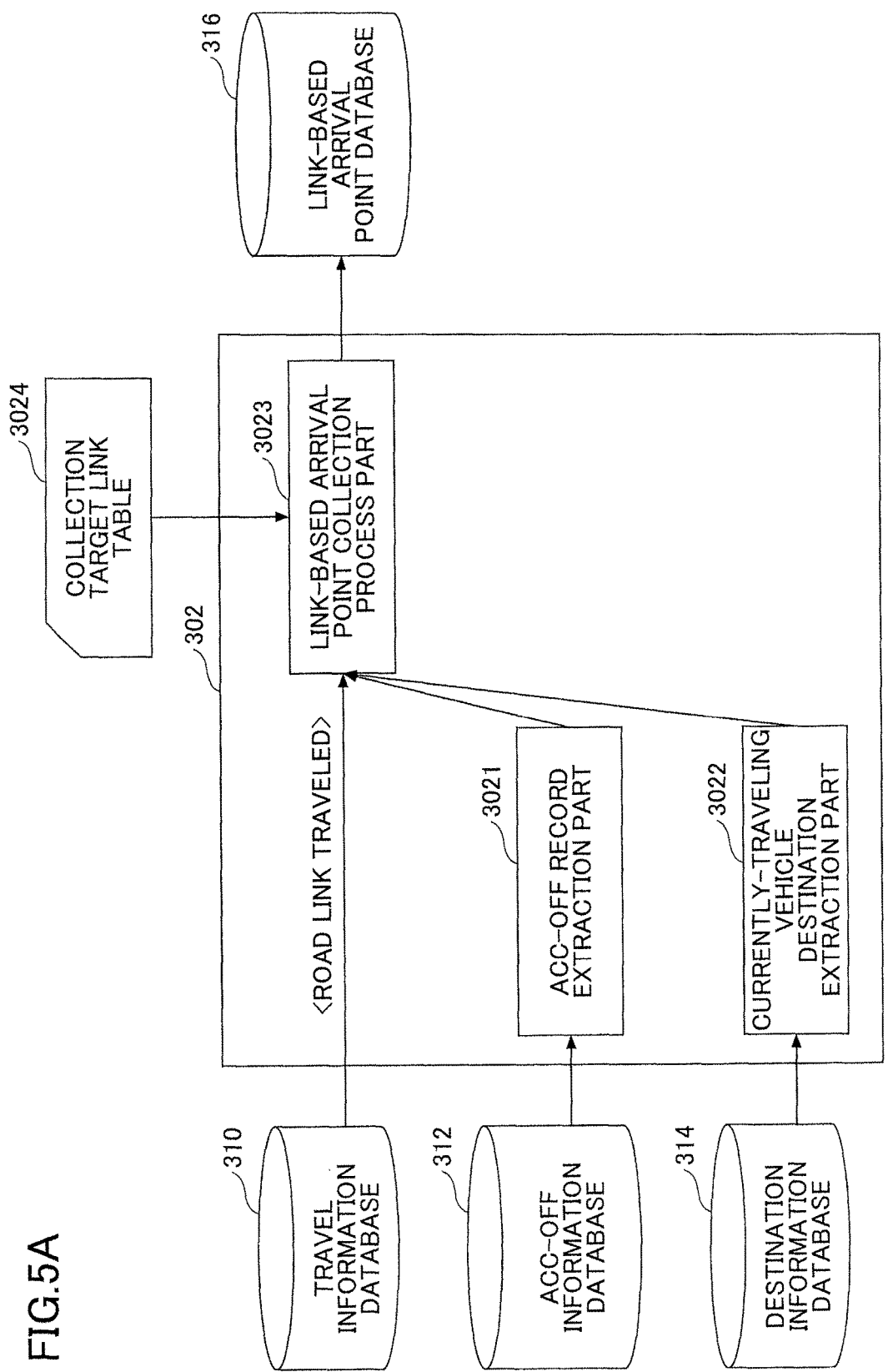
FIG. 5A is a functional block diagram of an arrival point collection part 302.

FIG. 5A is a functional block diagram of the arrival point collection part 302. The arrival point collection part 302 includes an ACC-OFF record extraction part 3021, a currently-traveling vehicle destination extraction part 3022, and a link-based arrival point collection process part 3023.

Figure 5B:
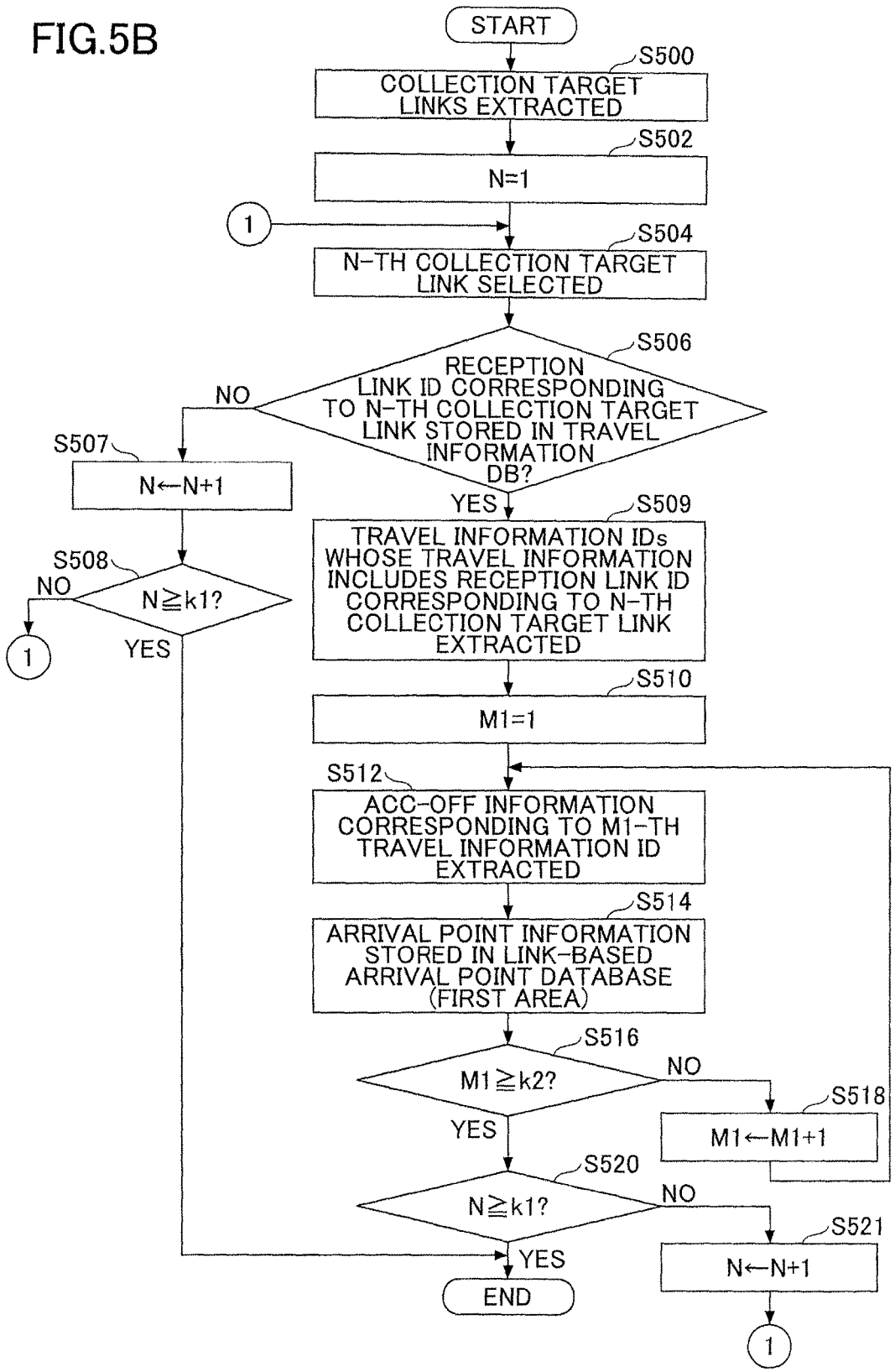
FIG. 5B is a flowchart illustrating an example of a first arrival point collection process of a link-based arrival point collection process part 3023.

FIG. 5B is a flowchart illustrating an example of a first arrival point collection process of the link-based arrival point collection process part 3023. The process illustrated in FIG. 5B is performed regularly (in off-line or on-line). The process illustrated in FIG. 5B is performed on a terminal ID basis. Thus, according to the explanation related to FIG. 5B, the data in the travel information database 310 and the ACC-OFF information database 312 are related to the terminal ID to be targeted.

In step S500, the link-based arrival point collection process part 3023 extracts collection target links based on a collection target link table 3024 (FIG. 5A). The collection target link table 3024 is a list of the link IDs of the collection target links which are predetermined. The collection target links include the links of the roads in which the traffic jam often occurs, for example. The link-based arrival point collection process part 3023 sorts the collection target links in a predetermined manner. For example, the link-based arrival point collection process part 3023 sorts the collection target links in an ascending order, and allocated numbers from "1" in an ascending order. Here, it is assumed that there are k1 collection target links.

In step S502, the link-based arrival point collection process part 3023 sets N to "1".

In step S504, the link-based arrival point collection process part 3023 selects the Nth collection target link.

In step S506, the link-based arrival point collection process part 3023 determines whether there is a reception link ID corresponding to the link ID of the Nth collection target link in the travel information database 310. If the determination result is "YES", the process goes to step S509, and if the determination result is "NO", the process goes to step S507.

In step S507, the link-based arrival point collection process part 3023 increments the value N by "1".

In step S508, the link-based arrival point collection process part 3023 determines whether the value N is greater than or equal to k1. If the determination result is "YES", the process ends, and if the determination result is "NO", the process returns to step S504.

In step S509, the link-based arrival point collection process part 3023 extracts, from the travel information database 310, the travel information IDs that include the travel information that in turn includes the reception link ID corresponding to the link ID of the Nth collection target link. The link-based arrival point collection process part 3023 sorts the extracted travel information IDs in an ascending order, and allocates numbers from "1" in an ascending order. Here, it is assumed that there are k2 extracted travel information IDs.

In step S510, the link-based arrival point collection process part 3023 sets M1 to "1".

In step S512, the link-based arrival point collection process part 3023 causes the ACC-OFF record extraction part 3021 to extract, from the ACC-OFF information database 312, the ACC-OFF information corresponding to the M1th travel information ID.

In step S514, the link-based arrival point collection process part 3023 stores the own vehicle position included in the ACC-OFF information extracted in step S512 as an "arrival point" in a first area of the link-based arrival point database 316 such that the arrival point is associated with the Nth collection target link (see FIG. 6A).

In step S516, the link-based arrival point collection process part 3023 determines whether the value M1 is greater than or equal to k2. If the determination result is "YES", the process goes to step S520, and if the determination result is "NO", the process goes to step S518.

In step S518, the link-based arrival point collection process part 3023 increments the value M1 by "1".

In step S520, the link-based arrival point collection process part 3023 determines whether the value N is greater than or equal to k1. If the determination result is "YES", the process ends, and if the determination result is "NO", the process returns to step S504 via step S521.

In step S521, the link-based arrival point collection process part 3023 increments the value N by "1".

According to the process illustrated in FIG. 5B, the arrival points can be collected, on a terminal ID basis and on a collection target link basis, to be stored in the first area of the link-based arrival point database 316. FIG. 6A is a diagram schematically illustrating an example of data in a first area in the link-based arrival point database 316. In FIG. 6A, data related to a certain collection target link is illustrated such that the data is associated with the terminal IDs. The data in the first area in the link-based arrival point database 316 includes the terminal ID, the arrival point (latitude and longitude), the arrival date/time, and travel date/time, as illustrated in FIG. 6A. The travel date/time corresponds to the one which is associated with the reception link related to the collection target link. Similar data is also generated with respect to other collection target links. The data in the first area of the link-based arrival point database 316 is rewritten (updated) every time when the process illustrated in FIG. 5B is performed. Alternatively, the process illustrated in FIG. 5B is performed with respect to the data accumulated after the previous process, and the data in the first area of the link-based arrival point database 316 may be additionally updated.

FIG. 7 is a flowchart illustrating an example of a second arrival point collection process of the link-based arrival point collection process part 3023. The process illustrated in FIG. 7 is performed in real time. The same processes as illustrated in FIG. 5B are given the same step numbers, and the explanation thereof is omitted.

In step S530, the link-based arrival point collection process part 3023 determines whether there is a reception link ID corresponding to the link ID of the Nth collection target link in the destination information database 314. If the determination result is "YES", the process goes to step S532, and if the determination result is "NO", the process goes to step S507.

In step S532, the link-based arrival point collection process part 3023 extracts, from the destination information database 314, the terminal ID whose destination information is associated with the reception link ID corresponding to the link ID of the Nth collection target link. The link-based arrival point collection process part 3023 sorts the extracted terminal IDs in an ascending order, and allocates numbers from "1" in an ascending order. Here, it is assumed that there are k3 extracted terminal IDs.

In step S534, the link-based arrival point collection process part 3023 sets M2 to "1".

In step S536, the link-based arrival point collection process part 3023 selects the M2-th terminal ID.

In step S538, the link-based arrival point collection process part 3023 causes the currently-traveling vehicle destination extraction part 3022 to extract, from the destination information database 314, the destination information related to the selected terminal ID.

In step S539, the link-based arrival point collection process part 3023 stores the destination extracted in step S538 as an "arrival point" in a second area of the link-based arrival point database 316 such that the arrival point is associated with the Nth collection target link.

In step S540, the link-based arrival point collection process part 3023 determines whether the value M2 is greater than or equal to k3. If the determination result is "YES", the process goes to step S544, and if the determination result is "NO", the process goes to step S542.

In step S542, the link-based arrival point collection process part 3023 increments the value M2 by "1".

In step S544, the link-based arrival point collection process part 3023 determines whether the value N is greater than or equal to k1. If the determination result is "YES", the process ends, and if the determination result is "NO", the process returns to step S504 via step S521.

According to the process illustrated in FIG. 7, the arrival points related to the arrival points of the vehicles that are traveling can be collected in real time, on a terminal ID basis and on a collection target link basis, to be stored in the second area of the link-based arrival point database 316. The data in the second area of the link-based arrival point database 316 is rewritten every time when the process illustrated in FIG. 7 is performed. FIG. 6B is a diagram schematically illustrating an example of data in the second area in the link-based arrival point database 316. In this way, according to the process illustrated in FIG. 5B and the process illustrated in FIG. 7 as described above, a collection result is stored, on a terminal ID basis and on a collection target link basis, in the link-based arrival point database 316.

The attribute determination part 303 determines, based on the collection result (the data in the first area in the link-based arrival point database 316 in the example, see FIG. 6A), attributes of the arrival points, on a terminal ID basis and on a collection target link basis. The attribute of the arrival point corresponds to an action type of the driver who went to the arrival point. The attribute determination part 303 associates an action flag, which have values according to the determination results of the attribute, with the arrival points. The values of action flag include a first value indicative of "commuting to work", a second value indicative of "going home", and a third value indicative of "other than that".

FIG. 8 is a functional block diagram of the upper limit value calculation part 303. The attribute determination part 303 includes a destination arrival number calculation part 3031 (an example of an arrival time calculation part), and a driver action category determination part 3032 (an example of an attribute determination part). In FIG. 8, the attribute information added database 317 obtained as a process result of the attribute determination part 303 is illustrated.

Figure 9:
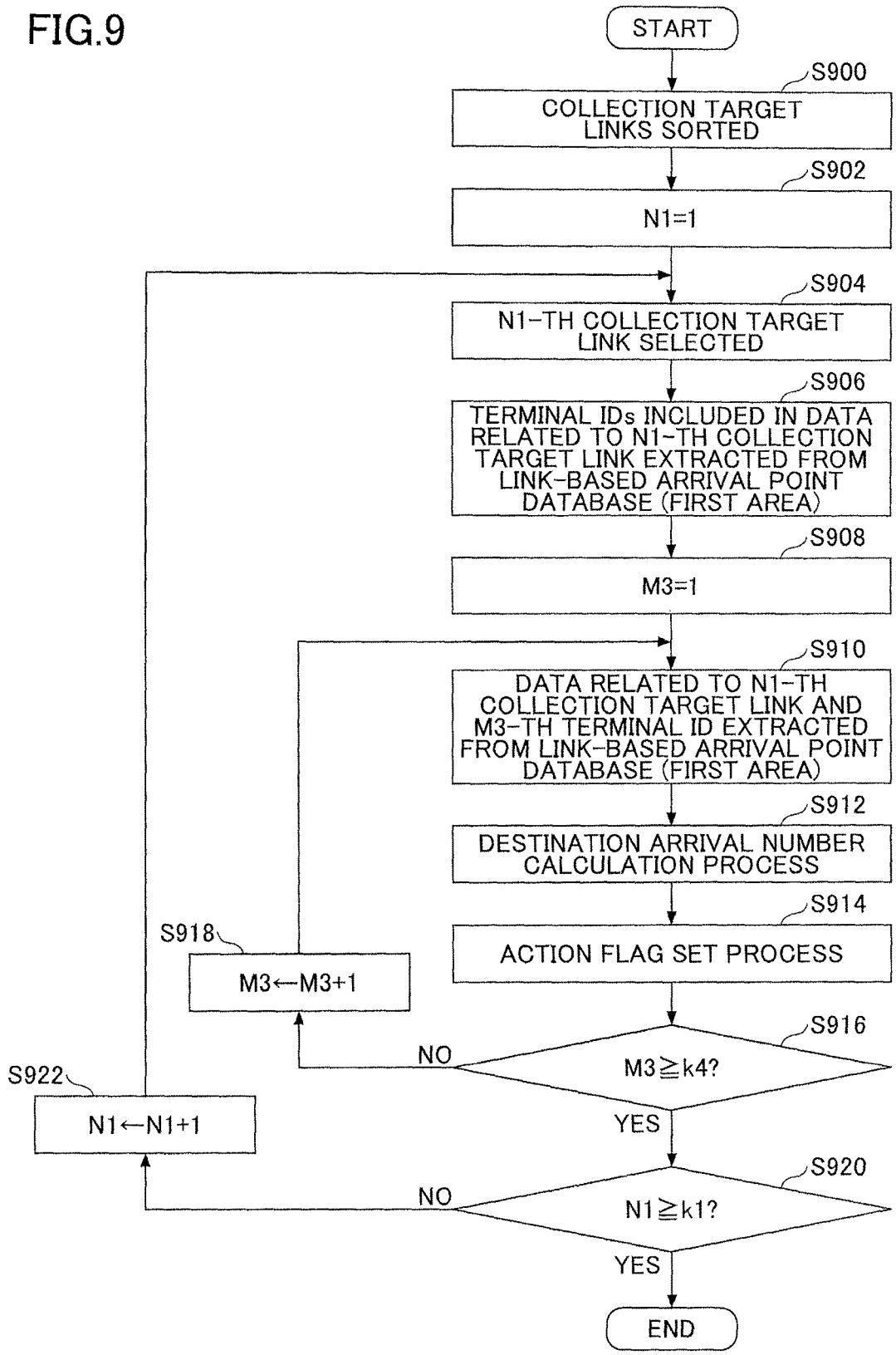
FIG. 9 is a flowchart illustrating an example of an attribute determination process of the attribute determination part 303.

FIG. 9 is a flowchart illustrating an example of an attribute determination process of the attribute determination part 303. The process illustrated in FIG. 9 is performed when the data in the first area of the link-based arrival point database 316 is updated by the process illustrated in FIG. 5B, for example.

In step S900, the destination arrival number calculation part 3031 sorts the collection target links in an ascending order, and allocates numbers from "1" in an ascending order. Here, it is assumed that there are k1 collection target links.

In step S902, the destination arrival number calculation part 3031 sets N1 to "1".

In step S904, the destination arrival number calculation part 3031 selects the N1-th collection target link.

In step S906, the destination arrival number calculation part 3031 extracts, from the first area of the link-based arrival point database 316, the terminal IDs which are included in the data corresponding the N1-th collection target link. Further, at that time, the destination arrival number calculation part 3031 extracts only the terminal IDs whose data in the first area of the link-based arrival point database 316 is updated with respect to the timing of the previous attribute determination process. The destination arrival number calculation part 3031 sorts the extracted terminal IDs in an ascending order, and allocates numbers from "1" in an ascending order. Here, it is assumed that there are k4 extracted terminal IDs.

In step S908, the destination arrival number calculation part 3031 sets M3 to "1".

In step S910, the destination arrival number calculation part 3031 extracts, from the first area of the link-based arrival point database 316, the data associated with the N1-th collection target link and associated with the M3-th terminal ID.

Figure 10:
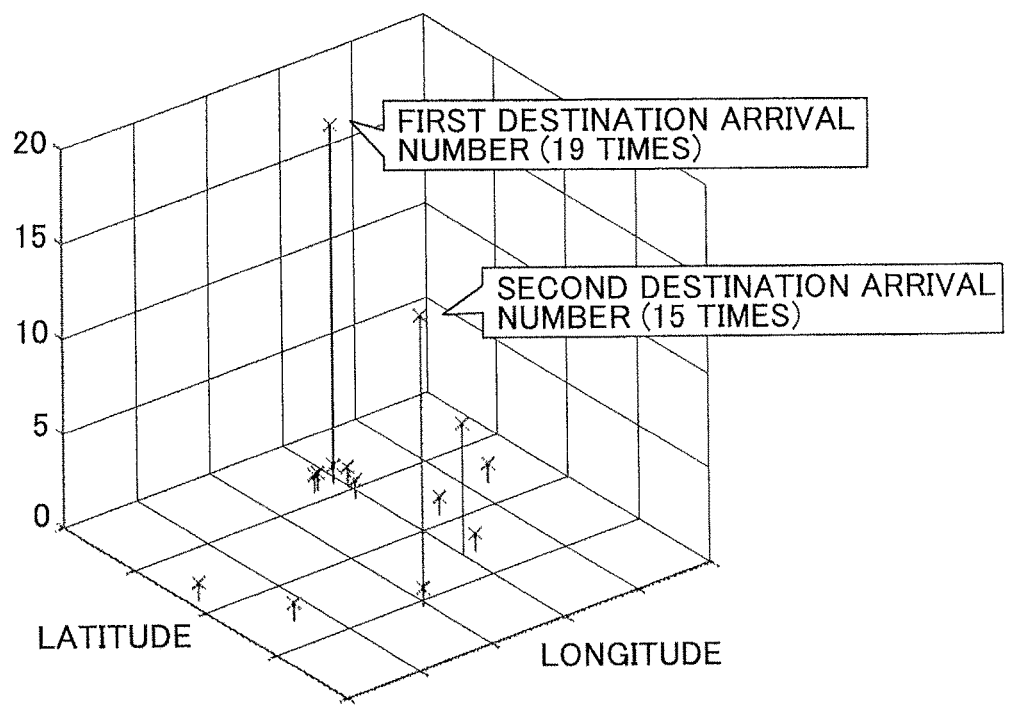
FIG. 10 is a diagram explaining the attribute determination process.

In step S912, the destination arrival number calculation part 3031 performs the destination arrival number calculation process based on the data extracted in step S910. The destination arrival number calculation part 3031 calculates the number (referred to as "an arrival number", hereinafter) of the arrival points related to the same destination based on the data extracted in step S910. Here, even the arrival points related to the same destination do not always have the same latitude and longitude, because the arrival points include errors such as measurement errors, etc. For this reason, for example, the destination arrival number calculation part 3031 divides a plane defined by latitudes and longitudes into a plurality of meshes whose size is determined to compensate for such errors, and counts the numbers of the arrival points included in the respective meshes as the arrival numbers related to the same destinations, respectively, as illustrated in FIG. 10. It is noted that, in FIG. 10, two axes of the plane corresponds to directions of the latitude and the longitude, and a vertical axis indicates the number. In the example illustrated in FIG. 10, the mesh size is about 50 m×about 50 m. It is noted that each mesh corresponds to each destination.

In step S914, the driver action category determination part 3032 performs an action flag setting process based on a destination arrival number calculation process result. Specifically, the driver action category determination part 3032 identifies, based on the arrival numbers calculated in step S914, the mesh whose arrival number is the greatest, and regards the arrival points included in said mesh as "home". Then, the driver action category determination part 3032 associates the "second value" of the action flag with the arrival points regarded as "home". Further, the driver action category determination part 3032 identifies, based on the arrival numbers calculated in step S914, the mesh whose arrival number is the second greatest and greater than or equal to a predetermined value Th1, and regards the arrival points included in said mesh as "place of work". Then, the driver action category determination part 3032 associates the "first value" of the action flag with the arrival points regarded as "place of work". The driver action category determination part 3032 determines the arrival positions in other meshes as "other than that", and associates the "third value" of the action flag with the arrival points in these meshes. This is because, in general, the places of work and home become arrival points per one commuting to work, and a frequency of commuting to work is less than that of going home (for example, in the case of a trip, the place of work does not become the arrival point on one way, but home becomes the arrival point on the other way). Further, in general, in the case where the vehicle is used for commuting to work, the frequency of commuting to work is substantially higher than that of going to places other than home. On the other hand, in the case where the vehicle is not used for commuting to work, the second greatest arrival number is not substantially greater. The predetermined threshold Th1 is a matched value, and the predetermined threshold Th1 is "3" if the data extracted in step S910 is 14 days data, for example. In FIG. 10, calculation results of a first destination arrival number and a second destination arrival number based on 28 days data, for example, with respect to a certain terminal ID are illustrated. The first destination arrival number corresponds to the number of the arrival points included in the mesh whose arrival number is the greatest, and the second destination arrival number corresponds to the number of the arrival points included in the mesh whose arrival number is the second greatest. In the example illustrated in FIG. 10, the first destination arrival number is "19"

and the second destination arrival number is "15" with respect to a certain terminal ID. In this case, the arrival points contributing to the first destination arrival number are regarded as "home", and the arrival points contributing to the second destination arrival number are regarded as "place of work".

Alternatively, the driver action category determination part 3032 identifies, based on the arrival numbers calculated in step S914, the mesh whose arrival number is the second greatest and is less than the first destination arrival number by less than or equal to a predetermined threshold Th2, and regards the arrival points included in said mesh as a "place of work". This is because, in general, the place of work and home become arrival points per one commuting to work, and a frequency of commuting to work is less than that of going home, but the difference therebetween tends to be relatively small.

In step S916, the destination arrival number calculation part 3031 determines whether the value M3 is greater than or equal to k4. If the determination result is "YES", the process goes to step S920, and if the determination result is "NO", the process returns to step S910 via step S918.

In step S918, the destination arrival number calculation part 3031 increments the value M3 by "1".

In step S920, the destination arrival number calculation part 3031 determines whether the value N1 is greater than or equal to k1. If the determination result is "YES", the process ends, and if the determination result is "NO", the process returns to step S904 via step S922.

In step S922, the destination arrival number calculation part 3031 increments the value N1 by "1".

According to the process illustrated in FIG. 9, the attributes of the arrival points are determined based on the collection result of the arrival points, on a terminal ID basis and on a collection target link basis, and the action flags are allocated to the arrival points as the determination result. With this arrangement, the result data in the attribute information added database 317 is obtained. The result data in the attribute information added database 317 can be generated by adding the action flags, which are obtained by the process illustrated in FIG. 9, to the data in the first area of the link-based arrival point database 316. FIG. 6C is a diagram conceptually illustrating an example of the result data in the attribute information added database 317. In the example illustrated in FIG. 6C, the result data in the attribute information added database 317 includes, on a collection target link basis, the terminal ID, the arrival point (latitude and longitude), the arrival date/time, and the action flag. In FIG. 6C, data related to a certain collection target link is illustrated.

Figure 11:
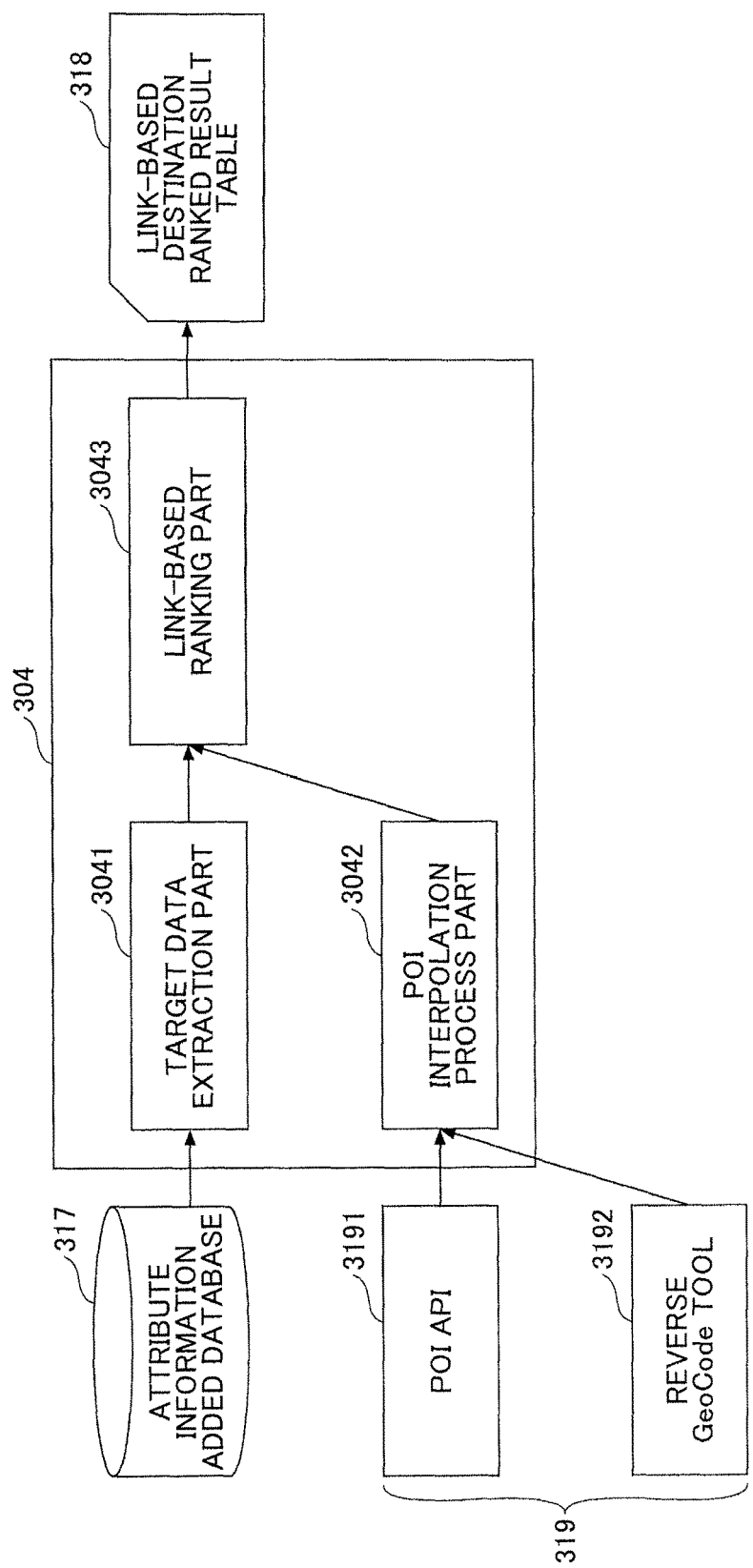
FIG. 11 is a block diagram of a ranking part 304.

FIG. 11 is a block diagram of the ranking part 304. The ranking part 304 includes a target data extraction part 3041, a POI (Point Of Interest) interpolation process part 3042, and a link-based ranking part 3043, as illustrated in FIG. 11. It is noted that, in FIG. 11, the position database API 319 is also illustrated, and the position database API 319 includes POI API 3191 and a reverse GeoCode tool 3192.

The target data extraction part 3041 extracts, from the attribute information added database 317, the result data on a collection target link basis, on one of days of the week basis, and on a time zone basis. It is noted that "on one of days of the week basis" may be replaced with "on week days or holiday basis". The time zone may be a hour, for example.

The POI interpolation process part 3042 uses the POI API 3191 to a POI table (not illustrated). In the POI table, POI names (formal names), genre names, and latitudes and longitudes of POIs (referred to as "POI positions", hereinafter) included in a section are defined, on a predetermined section basis, and POI_ID is defined on a POI name basis. The predetermined section has a size with about 503 m in latitude direction and 616 m in longitude direction, for example. The genre names are transportation facilities (a station, for example), famous spots, historic spots, sightseeing spots, leisure spots, etc. Further, the POI interpolation process part 3042 uses the reverse GeoCode tool 3192 to perform an interpolation process of POIs with respect to the section in which there is no POI. In this case, in the POI table, the POI names for the sections in which there is no POI may be defined with representative address names in the sections. Further, in the POI table, the POI positions for the sections in which there is no POI may be representative address in the sections, for example.

The link-based ranking part 3043 uses the POI table to rank the destinations, on a collection target link basis, for the data extracted by the target data extraction part 3041.

Figure 12:
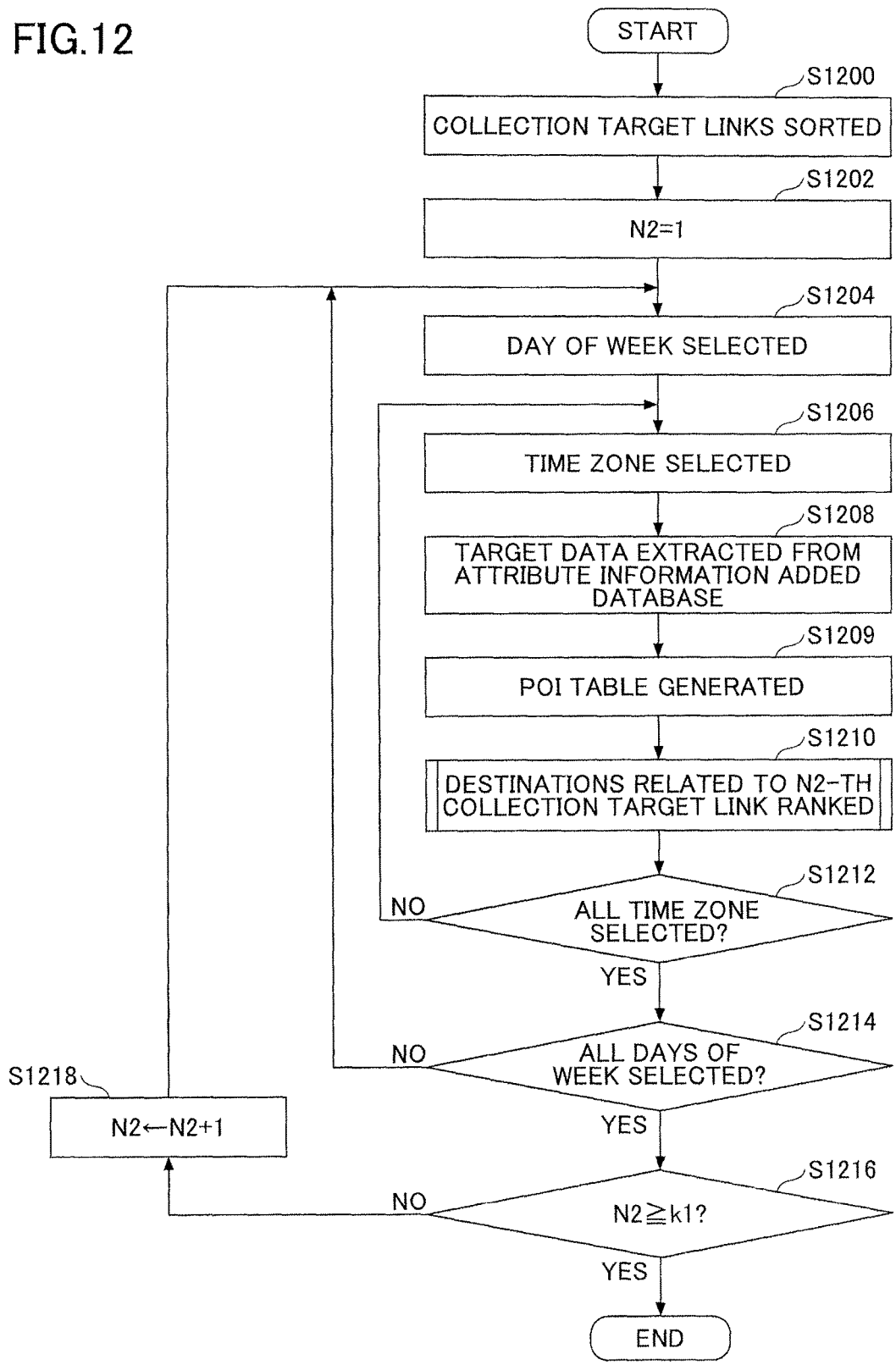
FIG. 12 is a flowchart illustrating an example of a destination ranking process of the ranking part 304.

FIG. 12 is a flowchart illustrating an example of a destination ranking process of the ranking part 304. The process illustrated in FIG. 12 is performed regularly (in off-line or on-line).

In step S1200, the target data extraction part 3041 sorts the collection target links in an ascending order, and allocates numbers from "1" in an ascending order. Here, it is assumed that there are k1 collection target links.

In step S1202, the target data extraction part 3041 sets N2 to "1".

In step S1204, the target data extraction part 3041 selects day of the week in order with respect to the N2-th collection target link. The selection order is arbitrary, but may be in order from Monday to Sunday, for example.

In step S1206, the target data extraction part 3041 selects one of the time zones in order with respect to the selected day of the week and the N2-th collection target link. The selection order of the time zones is arbitrary, but may be in order from 0 am with a hour length, for example.

In step S1208, the target data extraction part 3041 extracts, from the attribute information added database 317 (see FIG. 6C), the result data in the selected time zone on the selected day of the week and related to the N2-th collection target link as target data.

In step S1209, the POI interpolation process part 3042 generates the POI table covering the sections in which the arrival points included in the target data extracted in step S1208 are included. It is noted that if such a POI table is already generated and stored in advance, the process of step S1209 is omitted.

In step S1210, the link-based ranking part 3043 ranks, based on the target data extracted in step S1208 and the POI table, the destinations of the N2-th collection target link. This process is described hereinafter.

In step S1212, the target data extraction part 3041 determines whether all the time zones with respect to the selected day of the week and the N2-th collection target link have been selected. If the determination result is "YES", the process goes to step S1214, and if the determination result is "NO", the process returns to step S1206 to select another time zone.

In step S1214, the target data extraction part 3041 determines whether all days of the week with respect to the N2-th collection target link have been selected. If the determination result is "YES", the process goes to step S1216, and if the determination result is "NO", the process returns to step S1204 to select another day of the week.

In step S1216, the destination arrival number calculation part 3041 determines whether the value N2 is greater than or equal to k1. If the determination result is "YES", the process ends, and if the determination result is "NO", the process returns to step S1204 via step S1218.

In step S1218, the target data extraction part 3041 increments N2 by "1".

According to the process illustrated in FIG. 12, it becomes possible to extract the result data, on a collection target link basis, on one of days of the week basis, and on a time zone basis, from the attribute information added database 317, and cause the link-based ranking part 3043 to perform the ranking process.

Figure 13:
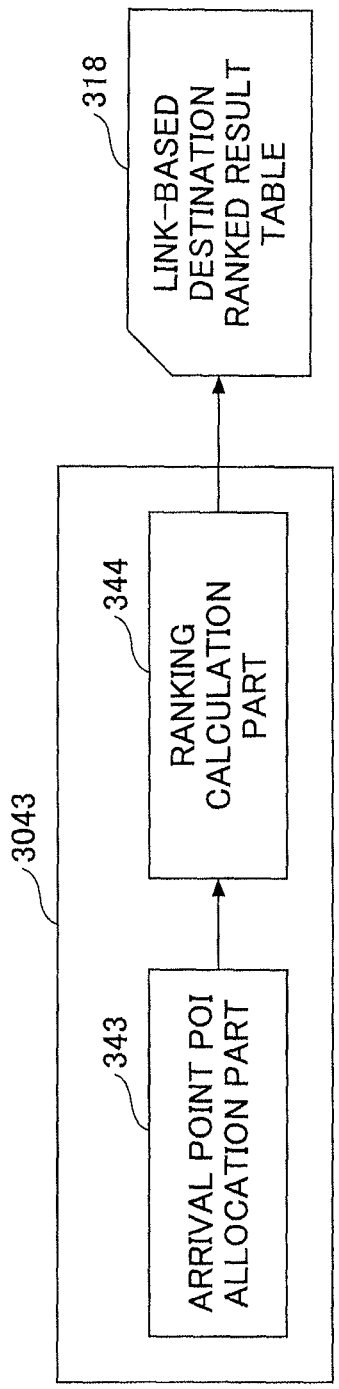
FIG. 13 is a functional block diagram of a link-based ranking part 3043.

FIG. 13 is a functional block diagram of the link-based ranking part 3043. The link-based ranking part 3043 includes an arrival point POI allocation part 343, and a ranking calculation part 344.

Figure 14:
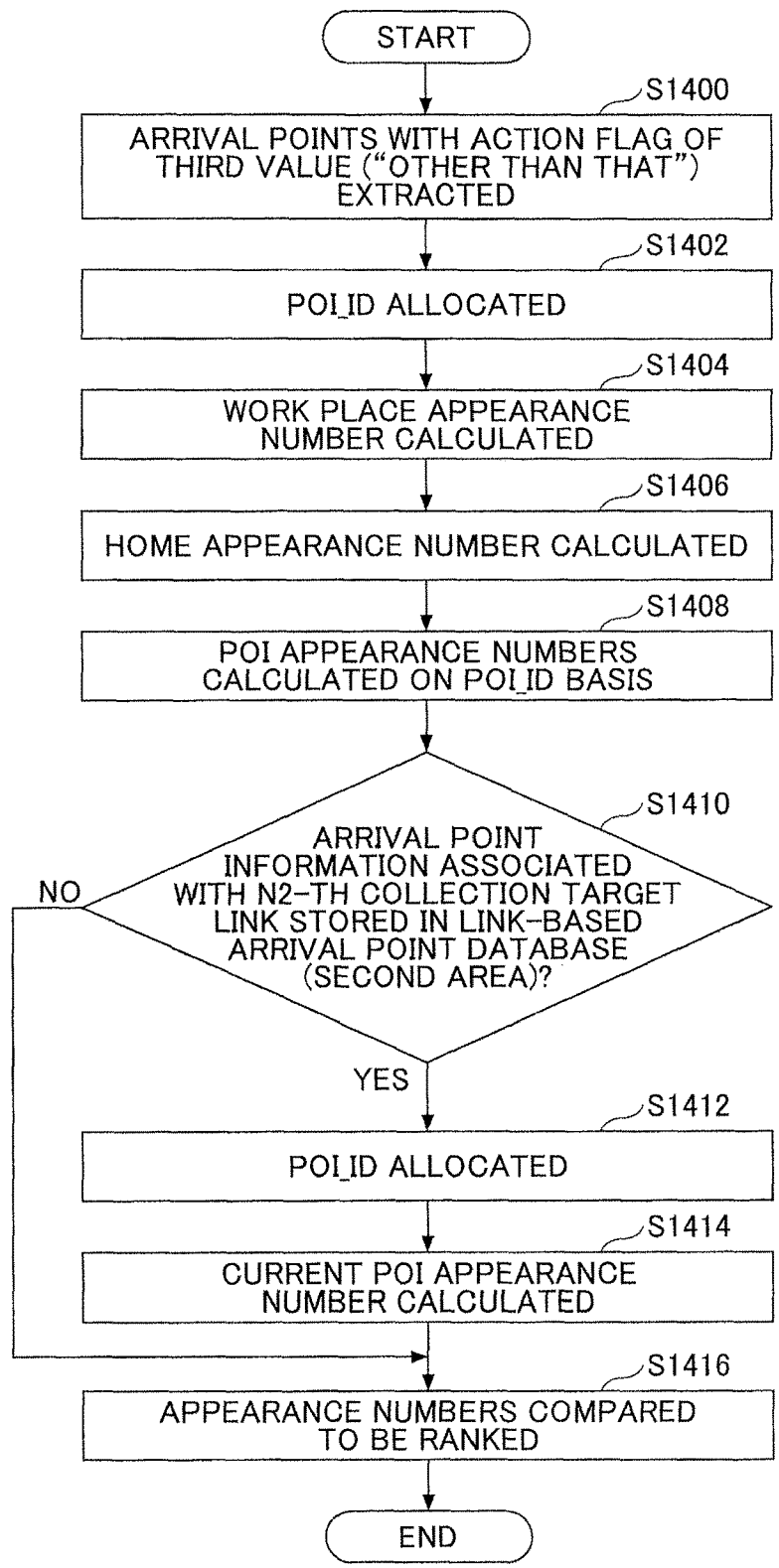
FIG. 14 is a flowchart illustrating an example of a destination ranking process of the link-based ranking part 3043.

FIG. 14 is a flowchart illustrating an example of a ranking process of the link-based ranking part 3043. The process illustrated in FIG. 14 is an example of the process of step S1210 illustrated in FIG. 12.

In step S1400, the arrival point POI allocation part 343 extracts, from the target data, the arrival points whose action flags have the third values ("other than that").

In step S1402, the arrival point POI allocation part 343 associates the POI_IDs with the arrival points extracted in step S1400 based on the POI table. When the arrival point POI allocation part 343 associates the POI_ID with a certain arrival point in a certain section in which there are a plurality of POIs, the arrival point POI allocation part 343 associates the POI_ID of the POI, among the a plurality of POIs, whose position is close to the arrival point the most. Further, when there is no POI in the section in which the arrival point is included, the arrival point POI allocation part 343 associates the POI_ID of the section (i.e., the section in which there is no POI) with the arrival point.

In step S1404, the ranking calculation part 344 sums the number of the arrival points whose action flags have the first value ("place of work"). In the following, the summed value is referred to as a "work place appearance number".

In step S1406, the ranking calculation part 344 sums the number of the arrival points whose action flags have the second value ("home"). In the following, the summed value is referred to as a "home appearance number". Then, the ranking calculation part 344 sums the work place appearance number and the home appearance number. In the following, the summed value is referred to as a "work place/home appearance number".

In step S1408, the ranking calculation part 344 sums the number of the arrival points whose POI_IDs are the same, on a POI_ID basis, with respect to the POI_IDs associated in step S1402. In the following, the summed value is referred to as a "POI appearance number".

In step S1410, the arrival point POT allocation part 343 determines whether there are any arrival points (destination) associated with the N2-th collection target link in the data in the second area of the link-based arrival point database 316. If the determination result is "YES", the process goes to step S1412, and if the determination result is "NO", the process goes to step S1416.

In step S1412, the arrival point POI allocation part 343 associates the POI_IDs with one or more arrival points associated with the N2-th collection target link in the data in the second area of the link-based arrival point database 316. A way of associating the POI_IDs is the same in step S1402.

In step S1414, the ranking calculation part 344 sums the number of the arrival points whose POI_IDs are the same, on a POI_ID basis, with respect to the POI_IDs associated in step S1412. In the following, the summed value is referred to as a "current POI appearance number".

Figures 15, 16:
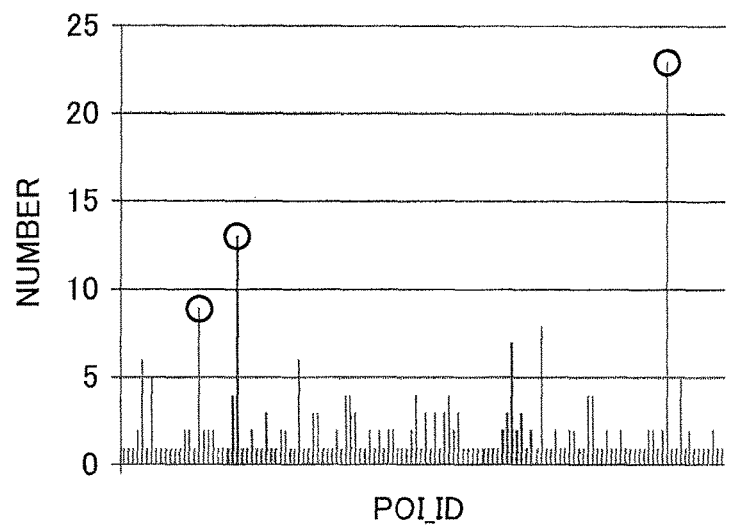
FIG. 15 is a diagram explaining a comparison way of a POI appearance number.
FIG. 16 is a diagram illustrating an example of a link-based destination ranked result table 318.

In step S1416, the ranking calculation part 344 compares the work place/home appearance number obtained in step S1406 and the represent POI appearance numbers obtained in step S1408 to rank the appearance number to allocate the higher ranking to the greater appearance numbers. At that time, with respect to the POI appearance numbers, the ranking calculation part 344 performs the comparison after adding the current POI appearance numbers to the POI appearance numbers of the corresponding POI_IDs. FIG. 15 is a diagram explaining a comparison way of the POI appearance numbers. In FIG. 15, a lateral axis indicates the POI_IDs, and a vertical axis indicates the (POI appearance numbers after the current POI appearance numbers are added). In the example illustrated in FIG. 15, the circled POI appearance numbers are the top three among the POI appearance numbers.

According to the process illustrated in FIG. 14, the numbers of the arrival points can be compared on an action flag basis, to be ranked. FIG. 16 is a diagram illustrating an example of the link-based destination ranked result table 318. In FIG. 16, a link-based destination ranked result table 318 with respect to a certain collection target link is illustrated. In the example illustrated in FIG. 16, the top three with the higher ranking (i.e., two POI names and "work place or home") are illustrated. Specifically, the POI_ID corresponding to POI name "Toyota hall" is the top, and "work place or home" is the second, and the POI_ID corresponding to POI name "** Nagoya City (address name)" is the third. In this way, the link-based destination ranked result table 318 in which the top three of the destinations are included on a collection target link basis.

The respective links are related to the destinations of the vehicles. For example, in order to go to a certain destination, there may be a case where the vehicle must travel on a certain link. Further, with respect to a certain destination to be headed to, there may be a case where the number of the drivers who use a certain link is the greatest. According to the processes illustrated in FIG. 12 and FIG. 14, it becomes possible to increase the probability that the higher ranked destination obtained as a result of the ranking process matches with the actual destination, because the ranking process is performed on a link basis.

Further, even the vehicles traveling on the same link may have different destinations, if the day of the week and the time zone are different. According to the processes illustrated in FIG. 12 and FIG. 14, it becomes possible to increase the probability that the higher ranked destination obtained as a result of the ranking process matches with the actual destination, because the ranking process is performed on a day of the week basis and on a time zone basis.

Further, in general, it is difficult to recognize the tendency of the destinations of the vehicles that travel on the collection target link that is used at the time of going home or commuting to work, because the place of work and home may be various. According to the process illustrated in FIG. 12 and FIG. 14, the "work place or home" of the vehicles are regarded as the same destination "work place or home" based on the action flag, it becomes possible to recognize the tendency of the destinations of the vehicles that travel on the collection target link that is used at the time of going home or commuting to work. As a result of this, it becomes possible to increase the probability that the higher ranked destination obtained as a result of the ranking process matches with the actual destination.

The destination information transmission part 306 generates the destination information to transmit the generated destination information to the on-vehicle device 2, in response to an event that the destination information request signal reception part 300 receives the destination information request signal from the on-vehicle device 2. In the following, the vehicle (the vehicle for which the destination information is to be provided) that transmits the destination information request signal is referred to as an "information providing target vehicle".

Figure 17A:
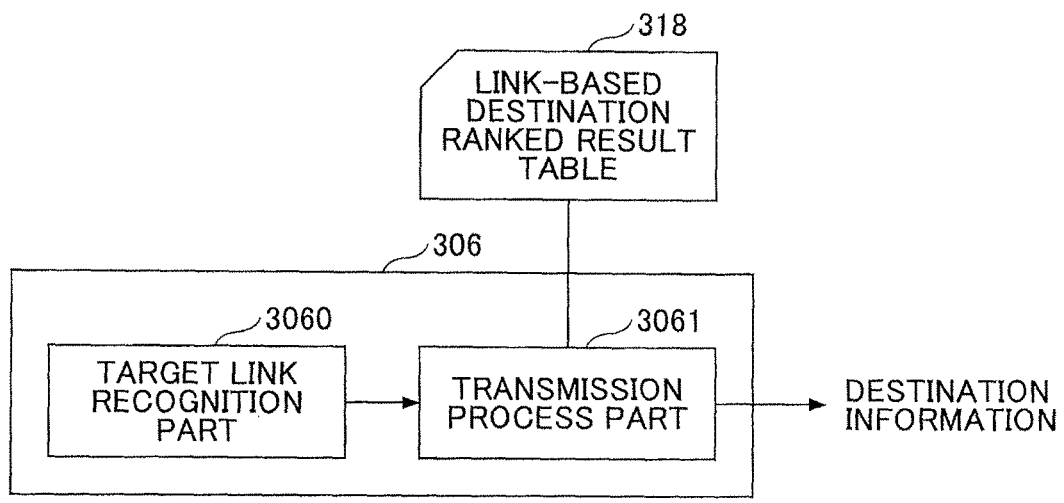
FIG. 17A is a block diagram of a destination information transmission part 306.

FIG. 17A is a block diagram of the destination information transmission part 306. The destination information transmission part 306 includes a target link recognition part 3060, and a transmission process part 3061.

The target link recognition part 3060 recognizes, based on the own vehicle position information (i.e., the position information of the information providing target vehicle) included in the destination information request signal, a link (referred to as a "target link", hereinafter) on which the information providing target vehicle travels.

The transmission process part 3061 generates, based on the link-based destination ranked result table 318, the destination information indicative of the destinations of other vehicles traveling on the target link recognized by the target link recognition part 3060. Here, the transmission process part 3061 generates, based on the link-based destination ranked result table 318, information as destination information that includes the destinations (the top three destinations) related to the target link recognize by the target link recognition part 3060. This is because the information indicative of the highly ranked destination can be the destination information that statistically represents the actual destinations of other vehicles traveling on the target link with high accuracy, as described above. When the target link is the collection target link, the destinations related to the target link include the top three of the ranked destinations with respect to the collection target link. On the other hand, when the target link is the collection target link, the destinations related to the target link may include the top three of the ranked destinations with respect to the collection target link that is near the target link the most. However, in terms of outputting accurate information, it is preferable to generate information indicative of the target link being "road not subject to evaluation", instead of generating the destination information. Then, the transmission process part 3061 transmits the generated destination information to the on-vehicle device 2 of the information providing target vehicle. At that time, if one of the destinations related to the target link is "work place or home", the destination information does not include information (addresses or names of the work places or home, for example) with which the work place or home can be identified. Specifically, the destination information indicative of the destination begin "work place or home" represents the action type "work place or home". With this arrangement, the destination information that does not include private information of the users can be transmitted to the vehicles. On the other hand, if the destinations related to the target link does not include "work place or home", the destination information includes the POI names and/or the POI positions of the respective destinations, for example.

Figure 17B:
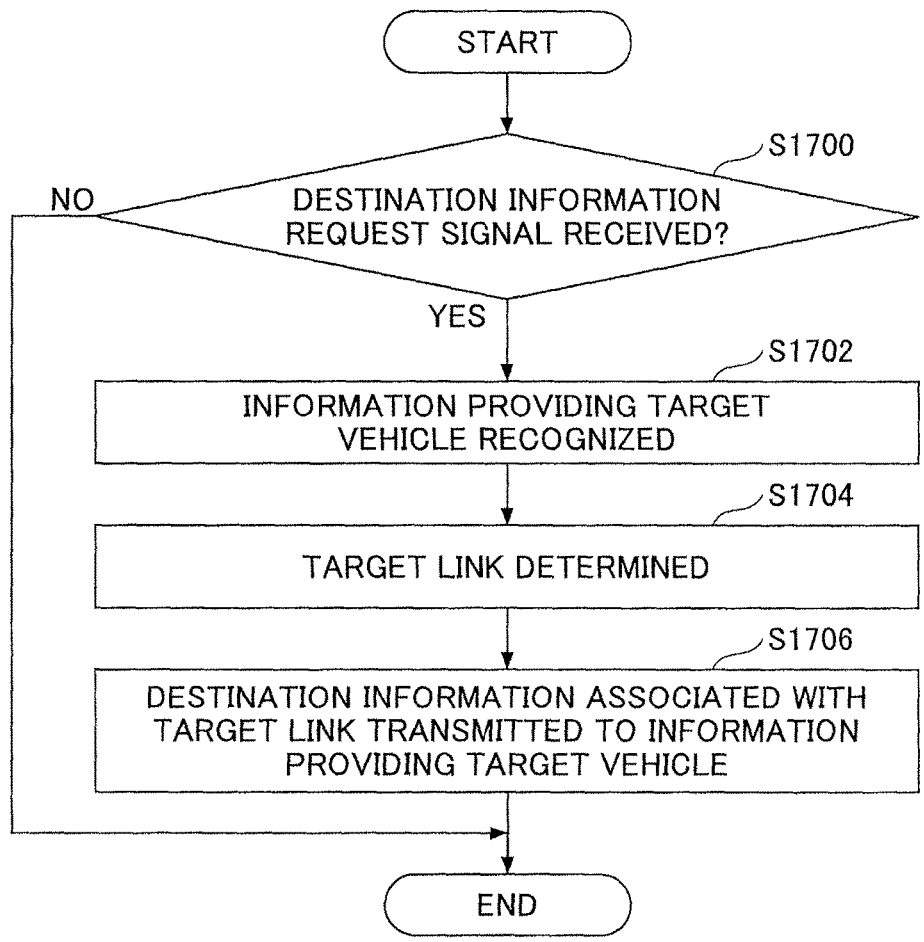
FIG. 17B is a flowchart illustrating an example of a destination information transmission process of the destination information transmission part 306.

FIG. 17B is a flowchart illustrating an example of a destination information transmission process of the destination information transmission part 306. The process illustrated in FIG. 17B is performed at a predetermined cycle.

In step S1700, the transmission process part 3061 determines whether the destination information request signal is received by the destination information request signal reception part 300. For example, the transmission process part 3061 determines that the destination information request signal is received by the destination information request signal reception part 300, if the information (the own vehicle position information, etc.) included in the destination information request signal from the destination information request signal reception part 300 is input. If the determination result is "YES", the process goes to step S1702, and if the determination result is "NO", the process at the cycle ends.

In step S1702, the transmission process part 3061 identifies the information providing target vehicle based on the target ID included in the destination information request signal.

In step S1704, the transmission process part 3061 causes the target link recognition part 3060 to identify the target link based on the own vehicle position information (i.e., the position information of the information providing target vehicle) included in the destination information request signal.

In step S1706, the transmission process part 3061 refers the link-based destination ranked result table 318 to transmit the destination information request signal, which is related to the target identified in step S1704 and represents the top three of the destinations with respect to the day of the week and the time zone corresponding the current day/time, to the on-vehicle device 2 of the information providing target vehicle. The transmission signal to transmit the destination information request signal is generated such that the transmission signal includes information represents the rankings of the destinations of the top three. For example, the transmission signal may have a data construction such that the destinations of the top three are included in a particular order, and may include data indicative of the rankings itself of the top three, or data indicative of the appearance numbers (the work place/home appearance number or the POI appearance numbers) of the top three. With this arrangement, the on-vehicle device that transmits the transmission signal can determine, based on the information included in the transmission signal, the difference (i.e., the rankings) between the probabilities of the top three destinations.

According to the process illustrated in FIG. 17B, the destination information including the destinations (the top three) related to the target link to the on-vehicle device 2 of the information providing target vehicle in response to the destination information request signal. In other words, the server 3 can transmit the destination information according to the target link of the vehicle to said vehicle (i.e., the information providing target vehicle) which transmits the destination information request signal.

Next, a process related to the destination information and performed in the on-vehicle device 2 is described.

Figure 18:
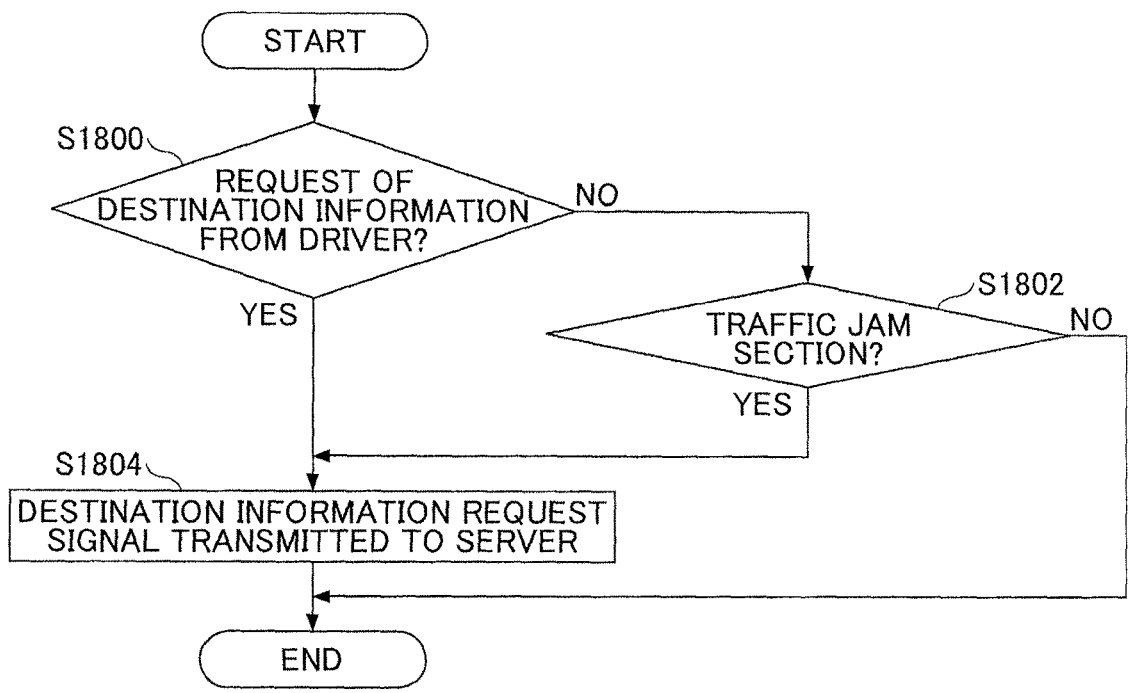
FIG. 18 is a schematic flowchart illustrating an example of a destination information request signal transmission process.

FIG. 18 is a schematic flowchart illustrating an example of a destination information request signal transmission process.

In step S1800, the driver demand determination part 72 determines, based on an input from the driver, whether a driver requests the destination information. If the determination result is "YES", the process goes to step S1804, and if the determination result is "NO", the process goes to step S1802.

In step S1802, the traffic jam determination part 70 determines whether the own vehicle enters a traffic jam section. If the determination result is "YES", the process goes to step S1804, and if the determination result is "NO", the process at the cycle ends.

In step S1804, the destination information request part 74 transmits the destination information request signal to the server 3.

According to the process illustrated in FIG. 18, when the own vehicle enters the traffic jam section, the destination information request signal can be transmitted to the server 3. Further, when the input from the driver is detected, the destination information request signal can be transmitted to the server 3.

It is noted that in the process illustrated in FIG. 18, one of step S1800 and step S1802 may be omitted. In the case where step S1800 is omitted, if the determination result of step S1802 is "YES", the process goes to step S1804, and if the determination result is "NO", the process at the cycle ends.

Figure 19:
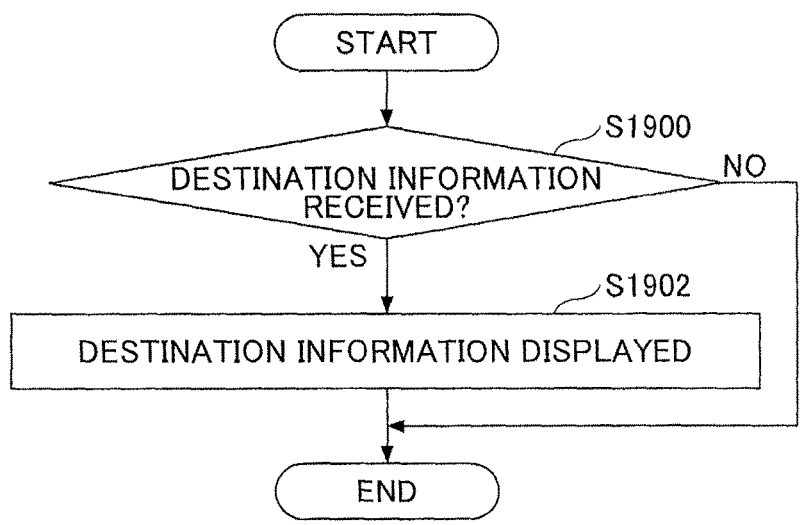
FIG. 19 is a schematic flowchart illustrating an example of a destination information reception process.

FIG. 19 is a schematic flowchart illustrating an example of a destination information reception process.

In step S1900, the display control part 76 determines whether the destination information is received via the communication module 82. If the determination result is "YES", the process goes to step S1902, and if the determination result is "NO", the process at the cycle ends.

In step S1902, the display control part 76 displays the received destination information on the display apparatus 83. Then, the display control part 76 determines the rankings of the top three destinations, and determines the display position of the destinations based on the rankings thereof. For example, the display control part 76 determines the display position of the destinations of the top three such that the higher ranked destination is displayed at the higher position in a screen. With this arrangement, the user can understand the difference in the probability between the displayed destinations.

FIG. 20 is a diagram illustrating an example of a displayed state of the destination information on a display apparatus 83. FIG. 20 illustrates displays on the screen of the communication module 82 in rectangular frames.

In the example illustrated in FIG. 20, the displays on the screen of the display apparatus 83 include a map display 90, an own vehicle display 91, a display "main destinations of surrounding vehicles" 93 indicative of destination display contents, respective displays 94, 95, and 96 indicative of three destinations, respective displays 94A, 95A, and 96A indicative of symbols of the destinations, and position displays 94B and 96B indicative of the destinations. It is noted that a voice output button 92 is a touch switch to be operated by a user who wants to output three destinations in a voice.

In this way, the driver (or other passengers) of the own vehicle can estimate the destinations of the surrounding vehicles by seeing the screen of the display apparatus 83. Thus, it becomes possible to output displays useful for the driver who is interested in the destinations of the surrounding vehicles. For example, in the traffic jam section, the driver may wonder where the surrounding vehicles are headed. At that time, when the driver sees the display as illustrated in FIG. 20, the driver can estimate the destinations of the surrounding vehicles, and clear uncertainty to feel clear-headed in the traffic jam section.

In the example illustrated in FIG. 20, the display 95 related to the second ranked destination is "work place or home". In the case of "work place or home", the position display thereof is not output. This stands in contrast to the displays 94 and 96 of other destinations for which the position displays 94B and 96B are output. This is because, with respect to "work place or home", the destination information does not include the position information of home, etc. In this case, it becomes possible to report to the driver of the own vehicle that the destinations of many vehicles are "work place or home" without using private information of users.

The present invention is disclosed with reference to the preferred embodiments. However, it should be understood that the present invention is not limited to the above-described embodiments, and variations and modifications may be made without departing from the scope of the present invention.

For example, according to the embodiments described above, the values of action flag includes a first value indicative of "commuting to work", a second value indicative of "going home", and a third value indicative of "other than that"; however, the values of action flag may include a first value indicative of "commuting to work" or "going home" and a second value indicative of "other than that". This is because, according to the embodiments described above, the different action types "going home" and "commuting to work" are collectively handled as a single action type "going home or commuting to work" in ranking the destinations.

Further, according to the embodiments described above, the different action types "going home" and "commuting to work" are collectively handled as a single action type "going home or commuting to work" in ranking the destinations. This results from a constraint on the display areas of the display apparatus 83. Thus, if there is reduced constraint on the display areas of the display apparatus 83, these two action types may be handled separately in ranking the destinations, and correspondingly the destinations "going home" and "commuting to work" are handled as separate destinations.

Further, according to the embodiments described above, the destination information database 314 (and thus the data in the second area in the link-based arrival point database 316) is used to reflect the destinations in real time on the ranking of the destinations; however, the destinations in real time may not be reflected. In this case, the addition of the current POI appearance number described above is not performed.

Further, according to the embodiments described above, the transmission process part 3061 transmits the destination information indicative of the top three destinations to the on-vehicle device 2 of the information providing target vehicle. However, the number of the top destinations to be transmitted to the on-vehicle device 2 of the information providing target vehicle is arbitrary. For example, the transmission process part 3061 may transmit the destination information including only the top destination, or the destination information indicative of the top two destinations to the on-vehicle device 2 of the information providing target vehicle. Alternatively, the transmission process part 3061 may transmit the destination information indicative of the top four destinations to the on-vehicle device 2 of the information providing target vehicle, instead of the destination information indicative of the top three destinations.

Further, according to the embodiments described above, the destinations are ranked; however, such ranking may not be performed. For example, as a variant, in the process illustrated in FIG. 14, in step S1416, the ranking calculation part 344 compares the work place/home appearance number obtained in step S1406 and the POI appearance numbers obtained in step S1408 with a predetermined threshold, and then records the destinations related to the appearance numbers exceeding the predetermined threshold in a link-based destination result table (not illustrated), instead of the link-based destination ranked result table 318, without ranking the destinations. In this case, the destination information transmission part 306 generates, based on the link-based destination result table, information indicative of the destinations (i.e., the destinations related to the target link and recorded in the link-based destination result table) related to the target link recognized by the target link recognition part 3060 as the destination information. This is because the information indicative of the destinations related to the appearance numbers exceeding the predetermined threshold can be the destination information that statistically represents the actual destinations of other vehicles traveling on the target link with high accuracy, as described above.

Further, as another variant, in the process illustrated in FIG. 14, in step S1416, the ranking calculation part 344 may compare the work place/home appearance number obtained in step S1406 and the POI appearance numbers obtained in step S1408 with a plurality of predetermined thresholds. Then, the ranking calculation part 344 categorizes the destinations into groups, such as the destinations related to the appearance numbers (work place/home appearance number or POI appearance numbers) exceeding a first predetermined threshold as a first group, the destinations related to the appearance numbers exceeding a second predetermined threshold smaller than the first predetermined threshold as a second group, and so on. Then, the ranking calculation part 344 records the destinations on a group basis in a link-based grouping result table (not illustrated), instead of the link-based destination ranked result table 318. In this case, the destination information transmission part 306 generates, based on the link-based grouping result table, information indicative of the destinations (i.e., the destinations related to the target link and included in the top predetermined number of the groups recorded in the link-based grouping result table) related to the target link recognized by the target link recognition part 3060 as the destination information.

It is noted that, with respect to the embodiments described above, the following is disclosed.

[Aspect 1]

A destination information provider server configured to:
store ranking information indicative rankings of vehicles traveling on a link, on a link basis, with respect to a plurality of links,
obtain position information of an information providing target vehicle,
recognize a target link, which corresponds to a link of a road on which the information providing target vehicle is traveling, based on the position information, and
transmit, based on the ranking information, destination information to the information providing target vehicle, the destination information being indicative of a predetermined number of highly ranked destinations of other vehicles which travel on the target link, the destinations being related to the target link.

[Aspect 2]

The destination information provider server of aspect 1, further configured to generate the ranking information, on a link basis, based on actual past result data related to a plurality of vehicles, the result data including information of the links on which the vehicles travel and information of arrival points as a result of traveling the links.

According to Aspect 2, the destination information can be generated with high accuracy based on the past result data. The increased accuracy of the destination information means the increased probability that the highly ranked destinations match the actual destinations of the vehicles traveling on the target link. Further, because the ranking information is generated on a link basis, the ranking information with the increased accuracy can be generated. This is because the rankings of the destinations when the link is used to travel could differ, depending on the link.

[Aspect 3]

The destination information provider server of aspect 2, further configured to generate the ranking information on a day of week basis and a time zone basis.

According to Aspect 2, the destination information can be generated with the further increased accuracy. This is because the rankings of the destinations when even the same link is used to travel could differ, depending on the day of week and the time zone.

[Aspect 4]

The destination information provider server of aspect 2, further configured to collect arrival points of the vehicles traveling on the links, on a link basis, based on the result data, and
generate the ranking information based on the collected arrival points.

According to Aspect 4, the destination information can be generated with high accuracy based on the collected arrival points.

[Aspect 5]

The destination information provider server of aspect 4, further configured to collect the arrival points on a vehicle basis and on a link basis,
calculate, based on the arrival points collected on a vehicle basis and on a link basis, the number of the arrival points related to the same destination, on a vehicle basis and on a link basis, and
determine an attribute of the arrival points based on the calculated number, wherein
the attribute of the arrival points includes a first type of "home" or "place of work", and a second type of "other than that", and
the ranking information is generated based on the determined attribute.

According to Aspect 5, the attribute of the arrival points can be determined with the increased accuracy, based on the arrival points collected on a vehicle basis and on a link basis. The difference between the first type and the second type can be distinguished easier when the arrival points collected on a vehicle basis are used. This is because the arrival points of the second type tend to be destinations of a number of the vehicles, while the arrival points of the first type tend to differ between the vehicles. Further, the ranking information with the increased convenience can be generated based on the attribute of the arrival points. For example, the arrival points of the first type related to the vehicles can be regarded as a single destination such that the destinations (private home or place of work, for example), which are not necessary to be reported to the drivers, are not included in the destination information, which increases the convenience.

[Aspect 6]

The destination information provider server of aspect 5, further configured to calculate a first parameter, which is a sum of the number of the arrival points of the first type, on a link basis, and a second parameter, which the number of the arrival points related to the same destination, on a destination basis and on a link basis, and
the ranking information is generated based on the calculated first parameters and second parameters.

According to Aspect 6, the arrival points of the first type (home or place of work) related to the vehicles can be handled as a single destination whose ranking can be evaluated based on the first parameter. With this arrangement, the arrival points of the first type and the arrival points of the second type can be compared with based on the separate parameters to be ranked, which increases the convenience of the ranking information.

[Aspect 7]

The destination information provider server of aspect 6, wherein when the ranking information is generated, if the calculated first parameter is the N-th greatest, "home or place of work" is ranked as N-th, where N is an integer.

[Aspect 8]

A destination information provider method in a server, the server being configured to store ranking information indicative rankings of vehicles traveling on a link, on a link basis, with respect to a plurality of links, obtaining position information of an information providing target vehicle;

recognizing a target link, which corresponds to a link of a road on which the information providing target vehicle is traveling, based on the position information, and transmitting, based on the ranking information, destination information to the information providing target vehicle, the destination information being indicative of a predetermined number of highly ranked destinations of other vehicles which travel on the target link, the destinations being related to the target link.

The present application is based on and claims the benefit of priority of Japanese Priority Application No. 2015-252432, filed on Dec. 24, 2015, the entire contents of which are hereby incorporated by reference.

What is claimed is:

1. A destination information provider server configured to:
   obtain position information of an information providing target vehicle,
   recognize a target link, which corresponds to a link of a road on which the information providing target vehicle is traveling, based on the position information,
   collect arrival points of a vehicle traveling on the target link, and
   transmit destination information to the information providing target vehicle, the destination information being indicative of destinations of other vehicles which travel on the target link based on an arrival point collection result.

2. The destination information provider server of claim 1, wherein the destinations include a home, and
   the destination information indicative of the destination being a home is information indicative of an action type "going home".

3. The destination information provider server of claim 1, wherein the destinations include a place of work, and
   the destination information indicative of the destination being a place of work is information indicative of an action type "commuting to work".

4. A destination information provision system, comprising:
   the destination information provider server of claim 1; and
   an on-vehicle processor installed on the information providing target vehicle,
   wherein
   the on-vehicle processor is configured to
   determine whether the information providing target vehicle enters a traffic jam section, and
   transmit a request signal for requesting the destination information to the destination information provider server based on a determination that the information providing target vehicle enters the traffic jam section,
   wherein
   the request signal includes the position information, and
   the destination information provider server obtains the position information from the request signal.

5. An on-vehicle processor configured to:
   transmit a request signal for requesting the destination information to the destination information provider server of claim 1, the request signal including the position information,
   receive the destination information, the destination information being transmitted from the destination information provider server in response to the request signal, and
   display the received destination information on a display apparatus.

* * * * *